United States Patent [19]
Furner et al.

[11] Patent Number: 5,974,474
[45] Date of Patent: Oct. 26, 1999

[54] SYSTEM FOR AUTOMATIC HARDWARE IDENTIFICATION AND CONFIGURATION WHERE INSTANCE VALUES ARE UNIQUE WITHIN THE COMPUTER SYSTEM AND RESOURCE REQUIREMENT CONFLICTS ARE RESOLVED BY MODIFYING RESOURCE SETTINGS

[75] Inventors: Rey R. Furner, Orem, Utah; Prabhakar Krishnaswami, Fort Collins, Colo.; Jeffrey A. Nordin, Orem, Utah; Michael E. Rex, Provo, Utah; Mark Dakins; Karl G. Jorgensen, both of Springville, Utah

[73] Assignee: Novell, Inc., Provo, Utah

[21] Appl. No.: 08/816,104

[22] Filed: Mar. 14, 1997

Related U.S. Application Data

[60] Provisional application No. 60/013,607, Mar. 15, 1996.

[51] Int. Cl.$^6$ .................................................. G06F 13/10
[52] U.S. Cl. .................................. 710/8; 710/9; 710/10; 710/104
[58] Field of Search .......................... 320/112; 358/468; 395/284, 651, 652, 742; 707/3; 710/8, 9, 10, 100, 104, 269; 713/1, 2

[56] References Cited

U.S. PATENT DOCUMENTS

| | | | |
|---|---|---|---|
| 4,974,151 | 11/1990 | Advani et al. | 710/8 |
| 4,979,107 | 12/1990 | Advani et al. | 710/100 |
| 5,426,780 | 6/1995 | Gerull et al. | 707/3 |
| 5,630,076 | 5/1997 | Saulpaugh et al. | 395/284 |
| 5,668,992 | 9/1997 | Hammer et al. | 395/651 |
| 5,696,605 | 12/1997 | Miller et al. | 358/468 |
| 5,734,911 | 3/1998 | Lai | 395/742 |
| 5,794,032 | 8/1998 | Leyda | 395/652 |
| 5,814,969 | 9/1998 | Banyas | 320/112 |

*Primary Examiner*—Thomas C. Lee
*Assistant Examiner*—Chien Yuan
*Attorney, Agent, or Firm*—Wolf, Greenfield & Sacks, P.C.

[57] ABSTRACT

An automatic identification system in a computer system having a plurality of hardware instances located on hardware devices in the computer system. The computer system includes a plurality of physical slots each configured to receive a hardware device and referenced by a slot number. The system comprises means for assigning a hardware instance value to each of the plurality of hardware instances, the hardware instance value being unique within the computer system when two or more of the plurality of physical slots are assigned a slot number that is not unique within the computer system. Advantageously, the hardware instance value is unique within the computer system when two or more of the plurality of hardware instances are located on one of the hardware devices or when one or more of the hardware devices is installed in an expansion chassis coupled to the computer system. The hardware instance value is also unique within the computer system when one of the hardware devices includes one or more of the hardware instances coupled to an I/O bus within the hardware device or when one or more of the hardware devices is installed on a system board in the computer system. In one embodiment of the invention, the hardware instance value is a hardware instance number. In another embodiment, the hardware instance value is a hardware instance name that is easily identifiable by the user.

61 Claims, 21 Drawing Sheets

FIG. 2A

HARDWARE INFORMATION TABLE

| HARDWARE IDENTIFIER | | | | PRODUCT IDENTIFIER | | | | | | RESOURCE SETTINGS | | | |
|---|---|---|---|---|---|---|---|---|---|---|---|---|---|
| BUS TAG 134 | UNIQUE ID 135 | HIN 222 | BUS TYPE 223 | DEVICE TYPE 230 | MODEL ID 224 | VENDOR ID 225 | VENDOR DEVICE ID 226 | SUBVENDOR ID 227 | SUBVENDOR DEVICE ID 228 | PRODUCT REVISION 229 | IRQ 136 | DMA 137 | I/O 138 | ROM/RAM 139 |
| | | | | | | | | | | | | | |

FIG. 2B

DRIVER INFORMATION TABLE

| DRIVER INFORMATION | | | | PRODUCT IDENTIFIER | | | | | | |
|---|---|---|---|---|---|---|---|---|---|---|
| DRIVER NAME 207 | DRIVER LOCATION 208 | BUS TYPE 223 | DEVICE TYPE 230 | MODEL ID 224 | VENDOR ID 225 | VENDOR DEVICE ID 226 | SUBVENDOR ID 227 | SUBVENDOR DEVICE ID 228 | PRODUCT REVISION 229 | OPTIONAL EXCLUDE INDICATOR 209 |
| | | | | | | | | | | |

FIG. 2C

Matched Driver Table (131)

| Driver Information | | | | Product Identifier | | | | | | |
|---|---|---|---|---|---|---|---|---|---|---|
| Driver Name 207 | Driver Location 209 | Bus Type 223 | Device Type 230 | Model ID 224 | Vendor ID 225 | Vendor Device ID 226 | Subvendor ID 227 | Subvendor Device ID 228 | Product Revision 229 | Optional Exclude Indicator 209 | Score 260 |

Unmatched Hardware Instance Table (132)

| Hardware Identifier | | | Product Identifier | | | | | | Resource Settings | | | |
|---|---|---|---|---|---|---|---|---|---|---|---|---|
| Bus Tag 134 | Unique ID 135 | HIN 222 | Bus Type 223 | Device Type 230 | Model ID 224 | Vendor ID 225 | Vendor Device ID 226 | Subvendor ID 227 | Subvendor Device ID 228 | Product Revision 229 | IRQ 136 | DMA 137 | I/O 138 | ROM/RAM 139 |

(201, 140, 142, 243)

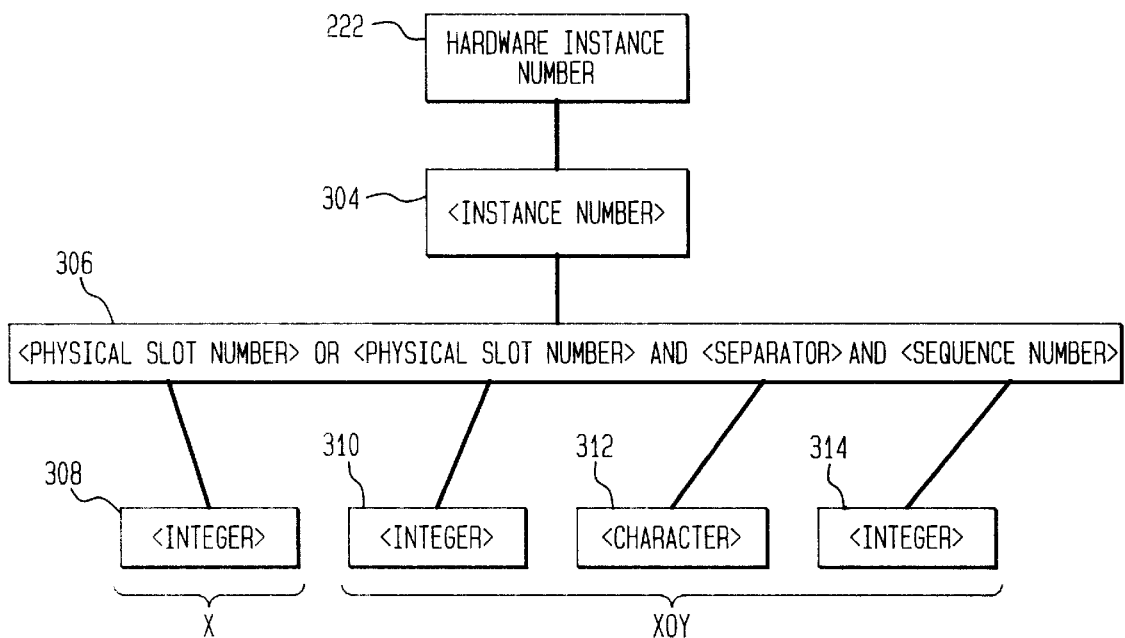

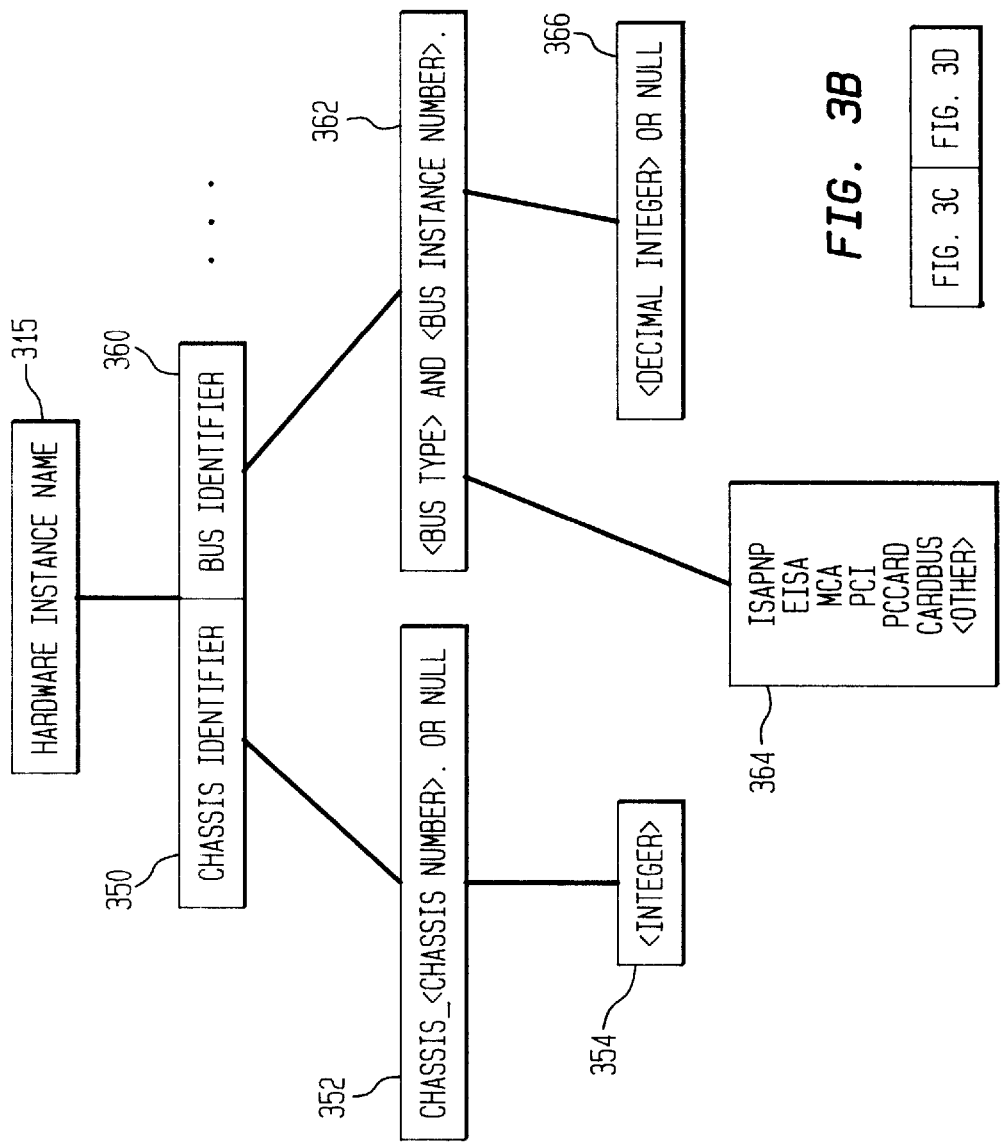

FIG. 3E

| HIN NAME | EXAMPLE ARRANGEMENT |
|---|---|
| EISA.SLOT_X | SINGLE FUNCTION EISA CARD IN SLOT X |
| EISA.SLOT_X.Y | MULTI-FUNCTION EISA CARD IN SLOT X; Y IS THE FUNCTION NUMBER |
| MCA.SLOT_X | SINGLE FUNCTION MCA CARD IN SLOT X |
| MCA.SLOT_X.Y | MULTI-FUNCTION MCA CARD IN SLOT X; Y IS THE FUNCTION NUMBER |
| ISAPNP.INSTANCE_A | SINGLE LOGICAL DEVICE PLUG AND PLAY ISA CARD, A IS A SEQUENCE LETTER |
| ISAPNP.INSTANCE_A.Y | MULTI-LOGICAL-DEVICE PLUG AND PLAY ISA CARD, A IS A SEQUENCE LETTER, Y IS THE LOGICAL DEVICE NUMBER |
| PCI.SLOT_X | SINGLE DEVICE/FUNCTION PCI CARD IN AN EXPANSION SLOT X OF A PCI BIOS V2.1 OR ABOVE |
| PCI.SLOT_X.Y | MULTI-FUNCTION PCI CARD OR PCI BRIDGE CARD, WHERE X IS THE SLOT NUMBER, AND Y IS THE FUNCTION OR DEVICE SEQUENCE NUMBER |
| PCI.INSTANCE_A | SINGLE DEVICE/FUNCTION PCI CARD IN A MACHINE WITH A PCI BIOS V2.0; A IS A SEQUENCE LETTER |
| PCI.INSTANCE_A.Y | MULTI-FUNCTION PCI CARD OR PCI BRIDGE CARD IN A MACHINE WITH A PCI BIOS V2.0; A IS A SEQUENCE LETTER, Y IS THE FUNCTION OR DEVICE NUMBER |
| PCI.EMBEDDED_SCSI | MOTHERBOARD SINGLE PCI SCSI CONTROLLER DEVICE |
| PCI.EMBEDDED_SCSI_A | MOTHERBOARD MULTIPLE PCI SCSI CONTROLLER DEVICE; A IS A SEQUENCE LETTER |
| CHASSIS_Z.PCI.SLOT_X | SINGLE DEVICE/FUNCTION PCI IN AN EXPANSION CHASSIS; X IS A SLOT NUMBER IN THE EXPANSION CHASSIS, Z IS A CHASSIS NUMBER |
| CHASSIS_Z.PCI.SLOT_X.Y | MULTI-FUNCTION OR BRIDGE PCI IN AN EXPANSION CHASSIS; X IS A SLOT NUMBER; Y IS A FUNCTION NUMBER; Z IS CHASSIS NUMBER |
| PCCARD.SLOT_X | PC CARD (PCMCIA) IN SOCKET X |
| PCCARD1.SLOT_X | PC CARD (PCMCIA) IN SOCKET X IN A SECOND SET OF SOCKETS ON A MACHINE THAT HAS MORE THAN ONE SET OF SOCKETS |

FIG. 4

| 401 | 402 | 403 | | 404 | 405 | | 406 | |
|---|---|---|---|---|---|---|---|---|
| HARDWARE INSTANCE 150 | IDENTIFICATION AND CONFIGURATION SYSTEM 119 | DRIVER 121 | | DRIVER DESCRIPTOR 122 | OPERATING SYSTEM 120 | | USER | |
| | | HIN-AWARE SYSTEM | NON-HIN-AWARE SYSTEM | | HIN-AWARE SYSTEM | NON-HIN-AWARE SYSTEM | HIN-AWARE SYSTEM | NON-HIN-AWARE SYSTEM |
| BUS TAG 134, UNIQUE IDENTIFIER 135, PRODUCT IDENTIFIER 140 | HIN NUMBER 222 / HIN NAME 315 | HIN NUMBER 222, PRODUCT IDENTIFIER 140, BUS TAG 134, UNIQUE ID 135 | SLOT NUMBER (HIN NUMBER 222) | PRODUCT IDENTIFIER 141 | HIN NUMBER 222 | SLOT NUMBER (HIN NUMBER 222) | HIN NAME 315 | SLOT NUMBER (HIN NUMBER 222) |

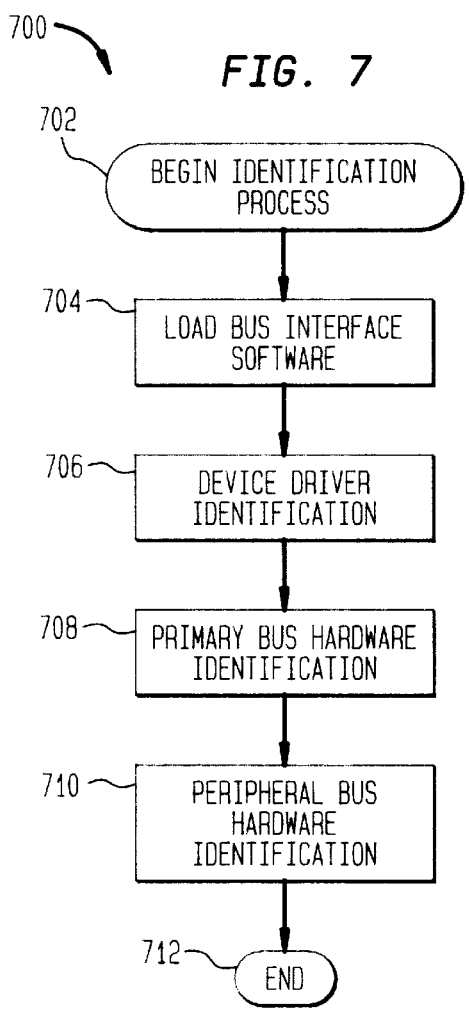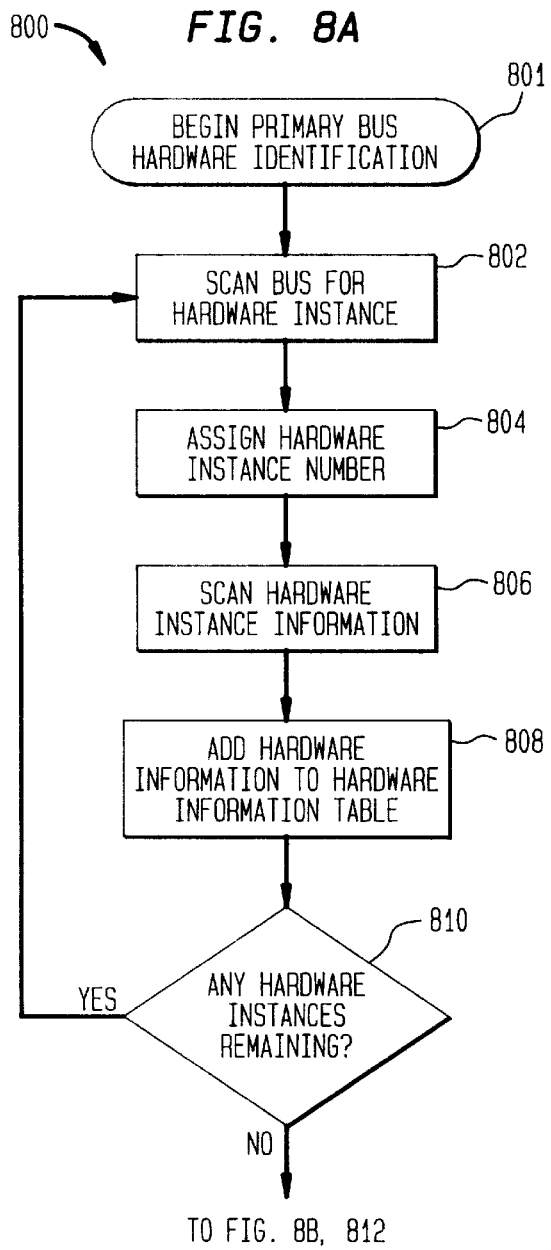

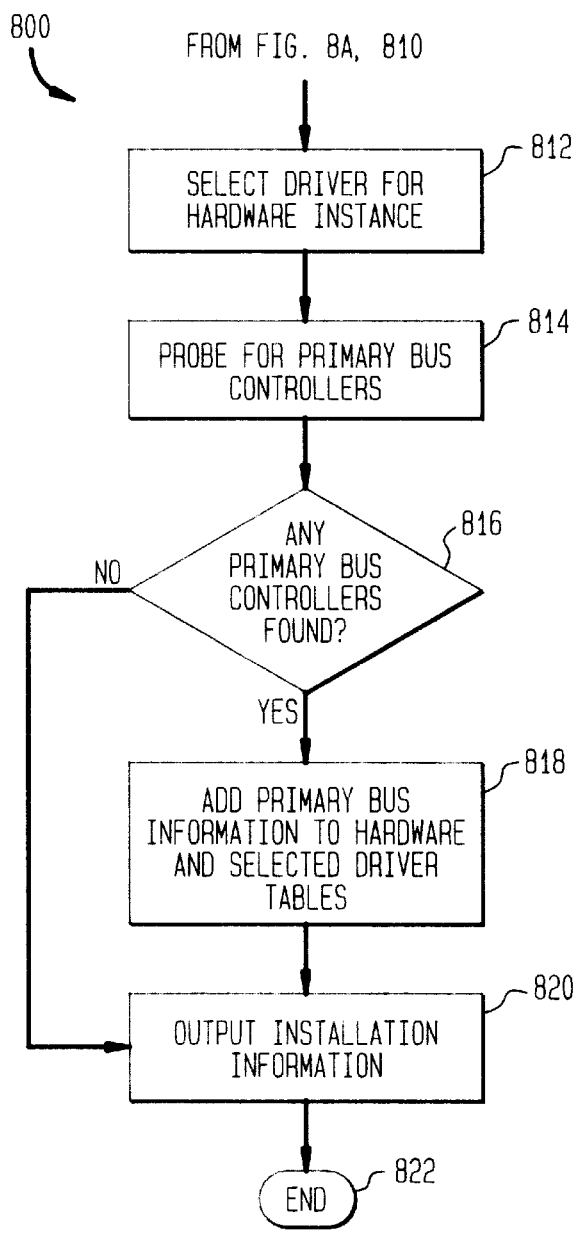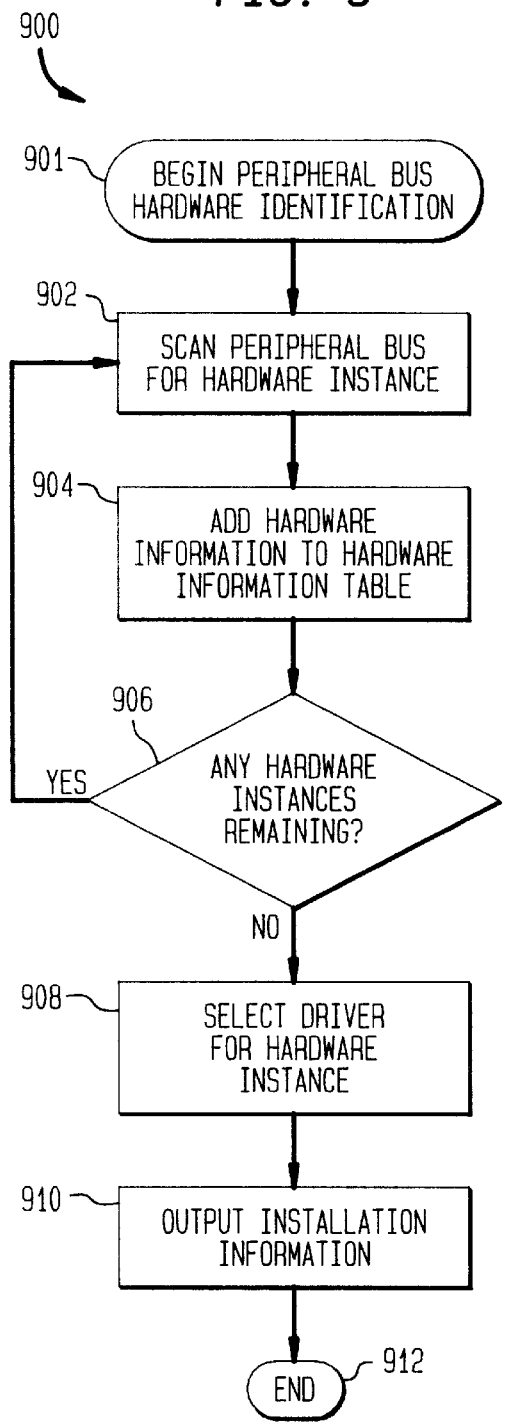

FIG. 12B

| BUS TYPE 223 | PRODUCT IDENTIFIER INFORMATION 141 (DRIVER INFORMATION TABLE 130) | PRODUCT IDENTIFIER INFORMATION 140 (HARDWARE INFORMATION TABLE 129) |
|---|---|---|
| SCSI | BUS TYPE<br>DEVICE TYPE<br>VENDOR ID<br>MODEL ID<br>PRODUCT REVISION | BUS TYPE<br>DEVICE TYPE<br>VENDOR ID<br>MODEL ID<br>PRODUCT REVISION |
| IDE | BUS TYPE<br>DEVICE TYPE<br>MODEL ID<br>PRODUCT REVISION | BUS TYPE<br>DEVICE TYPE<br>MODEL ID<br>PRODUCT REVISION |

PRODUCT IDENTIFIER WEIGHTS

| FACTORS →<br>COMPARISON ↓ | BUS TYPE 223 | DEVICE TYPE 230 | MODEL ID 224 | VENDOR ID 225 | VENDOR DEVICE ID 226 | SUBVENDOR ID 227 | SUBVENDOR DEVICE ID 228 | PRODUCT REVISION 229 |
|---|---|---|---|---|---|---|---|---|
| EXACT MATCH | 140 | 120 | 110 | 110 | 90 | 70 | 50 | 30 |
| .X?X. PATTERN | 135 | NOT APPLICABLE | 105 | 105 | 85 | 65 | 45 | 25 |
| .XX*. PATTERN | 130 | NOT APPLICABLE | 100 | 100 | 60 | 60 | 40 | 20 |
| .*. PATTERN | 125 | 115 | 95 | 95 | 75 | 55 | 35 | 15 |

1250

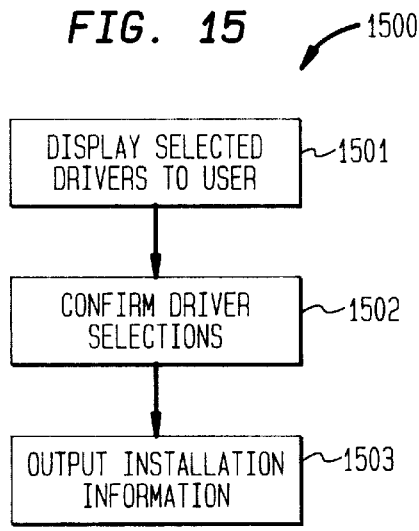
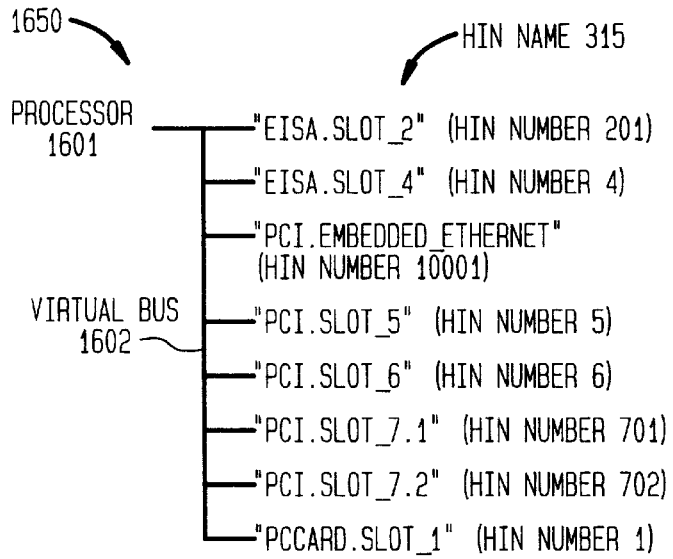
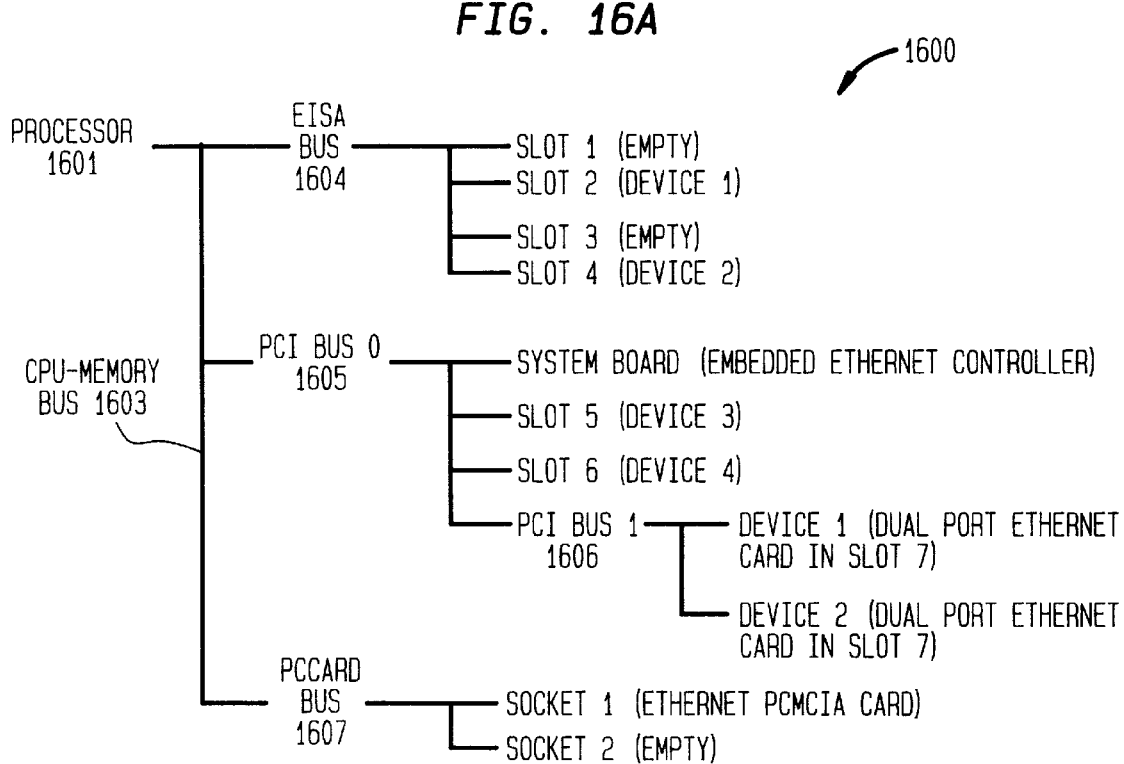

SYSTEM FOR AUTOMATIC HARDWARE IDENTIFICATION AND CONFIGURATION WHERE INSTANCE VALUES ARE UNIQUE WITHIN THE COMPUTER SYSTEM AND RESOURCE REQUIREMENT CONFLICTS ARE RESOLVED BY MODIFYING RESOURCE SETTINGS

RELATED APPLICATION

This application claims the benefit of U.S. Provisional Application No. 60/013,607, filed Mar. 15, 1996.

BACKGROUND OF THE INVENTION

1. Field of the Invention

The present invention relates generally to computer architecture and, more particularly, to a system and method for identifying and configuring computer hardware.

2. Related Art

A computer system is composed of a number of well-known hardware and software components. These components typically include a processor, memory, and communication buses, as well as bus controllers and a data storage device such as a hard disk drive. Generally one or more of the components are mounted on a printed circuit board referred to as a system board or, more commonly, a motherboard.

The functionality of the computer system can be expanded through the use of additional hardware devices. Such hardware devices are typically connected to the computer system through a physical slot on the system board that enables the installed hardware device to communicate with other components in the computer system. Slot numbers are generally used to identify the additional hardware devices to an operating system on the computer system. Thus, through the addition of hardware devices, a more complex computer system can be built.

Many different types of hardware devices are generally available. Hardware devices include, for example, network interface cards, fax/modem cards, sound cards, etc. Like other products, hardware devices are typically offered by different vendors, which often provide different models of each type of hardware device. Also, different versions of the hardware devices are often offered over time to accommodate revisions of a particular device model. These hardware devices are connected to the computer system through one or more input/output (I/O) buses, which may be of many different types including, for example, the well-defined ISA, EISA, and PnPISA buses.

For each additional hardware device installed in the computer system, an associated driver is loaded into the computer memory, and is used by the operating system and application programs to communicate with the associated hardware device. A driver is a software program that serves as an interface between two programs or between a program and a hardware device. Drivers are often specialized; a particular driver supports a single associated hardware device model and is often provided by the hardware device vendor.

Oftentimes, vendors provide generic drivers that can be used to communicate with more than one hardware device model to avoid creating drivers for every available model. Also, operating system manufacturers often provide both, a driver specifically configured for a particular hardware device model, as well as generic drivers which support multiple hardware device models. Although the generic drivers may be used to communicate with a hardware device, they sometimes lack the necessary functionality to enable the operating system or application programs to take advantage of all of the features offered by that hardware device. Using such a driver may not only be less efficient, but it may also unintentionally cause computer system errors or corrupt data.

In addition, problems arise when multiple drivers are installed in the computer system. A hardware device requires particular computer system resources to perform its intended functions. The settings on or within the installed hardware devices which identify the requisite resources may conflict with each other. That is, multiple hardware devices installed in the same computer system may have the same setting for a particular resource. For example, hardware devices typically require the use of a system resource referred to as an I/O port. An I/O port is an address which uniquely identifies a hardware device to the operating system for performing input and output functions from the processor. Since an I/O port address must be uniquely assigned to enable each hardware device to be accurately identified, one hardware device may not use the same I/O port address as another. Conflicting resource settings that cause such a condition must be resolved for the computer system to operate properly. Thus, the installation of drivers and the configuration of hardware devices has traditionally been a source of inefficiencies and errors in computer systems.

Historically, in Intel/IBM PC computer systems, users of a computer system who install and maintain the computer system have manually configured the system to support the various hardware devices that are installed in the system. For example, to add a network interface card to a computer system, the user was required to identify the correct resource settings from documentation provided with the network interface card, and verify that these resource settings did not conflict with resource settings of other installed hardware devices. The user was also required to load the required driver for the network interface card into the memory of the computer system. Thereafter, the functions of the network interface card could be accessed by the operating system and application programs running on the computer system if the resource settings were correctly selected and potential conflicts correctly anticipated.

Due to the complexity of computer systems and the multiple combinations of hardware devices which could be simultaneously present on a computer system, manual configuration has become problematic and time-consuming, even for technically-skilled users. Also, with the increased availability of computer systems to the general public, users with limited technical knowledge have become very numerous. These users generally cannot effectively or efficiently configure the computer systems to include various hardware devices.

As a result, over time, the hardware industry has evolved from manual configuration to software-assisted manual configuration. Software-assisted manual configuration provides the user with a more friendly interface for configuring a computer system and eliminates the requirement for the user to have knowledge of the resource settings. An example of such a software-assisted manual configuration system is the commonly available EISA Configuration Utility (ECU).

The EISA Configuration Utility (ECU) is a software program which identifies the proper resource settings such as hardware interrupts and memory settings for a particular hardware device installed on an EISA type bus. For example, in a computer system which has an EISA bus, a hardware device such as a network interface card is inserted by the user into an available slot. The user must run the ECU, and then manually load the driver for the hardware device, specifying the slot number corresponding to the physical slot where the hardware device is installed.

Although the user does not have to know the hardware interrupts and memory settings for the particular hardware device (since these settings are determined by the ECU), the user must nevertheless select the correct driver for the hardware device and specify the slot number where it was located. This is often time consuming and sometimes results in an incorrect driver being selected. Also, the ECU is only available for hardware devices installed in an EISA bus. There is no corresponding software assistance for other bus types such as IDE or ISA, making this approach extremely limited.

Some hardware systems have evolved from software-assisted manual configuration to rudimentary automatic identification and configuration. However, the existing automatic identification and configuration systems are also limited to a few specific systems and have many drawbacks. An example of such an automatic identification and configuration system is Windows 95™ Plug and Play, available from the Microsoft Corporation for use with the Windows 95™ operating system. (Windows 95 is a trademark of Microsoft Corporation.)

The Plug and Play system searches a list of drivers stored on the hard disk drive to determine which driver is appropriate for an installed hardware device. When the installed hardware devices are to be selected for a particular driver, the system accepts the first driver that it finds in the list that can support the hardware device. Since multiple drivers are often available, there may be drivers other than the one selected that are more appropriate for use with the particular hardware device. Even though there may be a more appropriate driver available, the system will not find that driver and associate it with the hardware device, since the selection process is completed after identifying the first compatible driver. In other words, Plug and Play treats all sufficient drivers as being equally acceptable for use with a hardware device, yielding less than optimal associations between drivers and hardware devices. As noted, this may result in a loss of functionality, data loss or corruption, system errors, etc.

Also, in the Plug and Play system a dialog box appears at the beginning of the configuration sequence to suggest the use of a default driver supplied with operating system. The Plug and Play system also provides the user with the option of selecting the vendor-supplied driver using a floppy disk or CDROM from the hardware device manufacturer. Unfortunately, the Plug and Play system does not qualify which of these drivers should be used with the hardware device. The user must have knowledge of the hardware device and driver, subjecting this approach to the same drawbacks as the software-assisted manual configuration approach described above.

Another drawback of Plug and Play is that it is limited to Intel/IBM PC systems which have the Windows 95 operating system installed, and therefore does not include such operating systems as DOS, Windows®, OS/2®, UNIX®, NetWare®) and IntranetWare® (Windows® is a registered trademark of Microsoft Corp., OS/2® is a registered trademark of International Business Machines Corporation, UNIX® is a registered trademark of X/Open Company, Limited, and NetWare® and IntranetWare® are a registered trademark of Novell, Incorporated.)

What is needed, therefore, is a hardware device identification and configuration system which is user-independent and is widely available on all types of computer systems. The system should select the most appropriate available driver to support a particular hardware device. The system should also be backwards compatible with existing operating systems and hardware devices.

SUMMARY OF THE INVENTION

The present invention relates to an automatic identification system in a computer system having a plurality of hardware instances located on hardware devices in the computer system. The computer system includes a plurality of physical slots each configured to receive a hardware device and is referenced by a slot number. The system comprises means for assigning a hardware instance value to each of the plurality of hardware instances, the hardware instance value being unique within the computer system when two or more of the plurality of physical slots are assigned a slot number that is not unique within the computer system.

Advantageously, the hardware instance value is unique within the computer system when two or more of the plurality of hardware instances are located on one of the hardware devices or when one or more of the hardware devices is installed in an expansion chassis coupled to the computer system. The hardware instance value is also unique within the computer system when one of the hardware devices includes one or more of the hardware instances coupled to an I/O bus within the hardware device or when one or more of the hardware devices is installed on a system board in the computer system.

In one embodiment of the invention, the hardware instance value is a hardware instance number. In another embodiment, the hardware instance value is a hardware instance name that is easily identifiable by the user.

Each of the hardware devices contains a bus tag and a device identifier for each hardware instance on the hardware device. For each hardware instance, the hardware instance value is a hardware instance number associated with the bus tag and device identifier for each hardware instance.

When one or more physical slots is assigned a slot number unique within the computer system, for each the plurality of hardware instances installed within such first physical slots, the hardware instance number is equal to the unique slot number. When two or more of the physical slots are assigned the same slot number, for each the plurality of hardware instances installed within such physical slots, the hardware instance number is equal to the slot number and a unique sequence number, resulting in a computer system-unique hardware instance number. When one of the hardware instances do not correspond to a physical slot within the computer system, for each such hardware instances, the hardware instance number is equal to the unique slot number and a sequence number associated with the hardware instance, the sequence number being unique for each the of the hardware instances.

In another aspect of the invention, an identification and configuration system in a computer system is disclosed. The computer system includes a hardware instance and a plurality of drivers capable of supporting the hardware instance. The system comprises means for determining a relative capability of each the plurality of drivers to support the hardware instance, and means for selecting an optimal driver having a capability to support the hardware instance that is greater than a capability of other drivers to support the hardware instance.

In one embodiment, the system further comprises means for installing the optimal driver.

Preferably, the capability of a driver to support the hardware instance is represented by a value derived from one or more factors, each reflecting a driver's capability to support a particular hardware instance. In one embodiment, the factors are weighted in accordance with a degree to which the factor reflects a driver's capability to support a particular hardware instance, and the value is the sum of the weights of the factors.

In another embodiment, the factors are associated with a first product identifier identifying the hardware instance, and plurality of second product identifiers, each identifying, for an associated one of the plurality of drivers, the hardware instances supported by the associated driver.

Preferably, the one of the factors is a similarity between the first and second product identifier. The factor is a weighted value according to a similarity between the first and second product identifier.

In one embodiment, the selecting means comprises means for comparing portions of the first and second product identifiers, wherein the factors include second factors, each representing a similarity between the compared portions of the first and second product identifiers. The factors are weighted values according to a similarity between the corresponding portions of the first and second product identifier. Preferably, the degree of similarity is a degree of difference between string values of the compared product identifier subfields.

In one embodiment, the portions of the first and second product identifiers comprises a model ID identifying the model of the associated hardware instance, a vendor ID identifying the vendor of the hardware instance, and a vendor device ID identifying the device number of the hardware instance, a device type identifying the type of device, assigned by the vendor. The portions may also include a product revision identifying a version of the hardware instance, a subvendor ID identifies the vendor which manufactures the particular chip or hardware component in the hardware instance, and a subvendor device ID identifies the vendor-assigned device number for the components of the hardware instance.

In another aspect of the invention an automatic identification and configuration system is disclosed. The system is included in a computer system having a plurality of hardware instances located on hardware devices in the computer system, the computer system including a plurality of physical slots each configured to receive a hardware device and referenced by a slot number, and a plurality of drivers capable of supporting the hardware instances. The identification and configuration system comprises means for assigning a hardware instance value to each of the plurality of hardware instances, the hardware instance value being unique within the computer system, means for determining a relative capability of each the plurality of drivers to support the hardware instance, means for selecting an optimal driver having a capability to support the hardware instance that is greater than a capability of other drivers to support the hardware instance, and means for installing the optimal driver.

Preferably, the capability of a driver to support the hardware instance is represented by a value derived from one or more factors, each reflecting a driver's capability to support a particular hardware instance. The factors are weighted in accordance with a degree to which the factor reflects a driver's capability to support a particular hardware instance.

The factors are preferably associated with a first product identifier identifying the hardware instance, and plurality of second product identifiers, each identifying, for an associated one of the plurality of drivers, the hardware instances supported by the associated driver.

In one embodiment, the selecting means comprises means for comparing portions of the first and second product identifiers, wherein the factors include second factors, each representing a similarity between the compared portions of the first and second product identifiers, wherein the second factors are weighted values according to a similarity between the corresponding portions of said first and second product identifier.

In another embodiment of this aspect, the portions of the first and second product identifiers comprise a model ID identifying the model of the associated hardware instance, a device type identifying the type of device, a vendor ID identifying the vendor of the hardware instance, a vendor device ID identifying the device number of the hardware instance assigned by the vendor, and a product revision identifying a version of the hardware instance. The portions of the first and second product identifiers may also include a subvendor ID identifies the vendor which manufactures the particular chip or hardware component in the hardware instance, and a subvendor device ID identifies the vendor-assigned device number for the components of the hardware instance.

Each of the hardware devices contains a bus tag and a device identifier for each hardware instance on the hardware device. For each hardware instance, the hardware instance value is a hardware instance number associated with the bus tag and device identifier for the each hardware instance.

In another aspect of the invention a hardware identification and configuration system is disclosed. The system is included within a general purpose computer system including a first hardware device having first hardware configuration information and a second hardware device having second hardware configuration information. The identification and configuration system comprises an identification mechanism configured to obtain first and second hardware configuration information, and a configuration mechanism configured to resolve a conflict between the first and second hardware configuration information.

In one embodiment, the first and second hardware configuration information are obtained from the first and second hardware devices, respectively. Alternatively, the first and second hardware configuration information are obtained from a table in a memory of the computer system.

In another aspect of the invention, a method for automatically identifying and configuring a plurality of hardware instances on a computer system is disclosed. The method includes the steps of a) uniquely identifying each of the plurality of hardware instances, b) selecting an optimal driver with a highest relative capability from a plurality of drivers configured to support each of the plurality of hardware instances, and c) loading the optimal driver into a run-time memory of the computer system.

The step a) may include the steps of 1) identifying the plurality of drivers stored on the computer system, 2) scanning busses for the plurality of hardware instances, 3) identifying each of the plurality of hardware instances, and 4) scanning each of the plurality of hardware instances for hardware instance information. The process may also include the step of 6) storing the hardware instance information in a table in the run-time memory of the computer system.

Each of a plurality of driver descriptors, each associated with one or the plurality of drivers, includes a product identifier specifying specific hardware instances that each of the plurality of drivers can support and wherein the step 2) comprises the step of: (a) scanning each of the plurality of driver descriptors associated with each of the plurality of drivers for the product identifier.

In one embodiment, the step 3) comprises the step of (a) scanning registers of each hardware instance for hardware instance information, the hardware instance information including a product identifier and resource settings.

In one embodiment, the step 4) comprises the steps of (a) uniquely identifying each hardware instance by a hardware instance number equal to a physical slot number on the computer system, when the physical slot number is unique, and (b) uniquely identifying each hardware instance by a hardware instance number equal to a sequence number when the physical slot number is not unique.

In another embodiment, the step b) comprises the steps of: 1) comparing each factor for the product identifier of each hardware instance to the associated factor for the product identifier of each driver descriptor, 2) determining a weighted score for each factor based on the comparing step, 3) combining the weighted scores of each factor to produce a total weighted value for each of the driver descriptors, and 4) selecting the optimal driver from the plurality of drivers based on the total weighted value.

In another embodiment of the invention, the system is composed of an identification mechanism and a configuration mechanism. The identification mechanism identifies a hardware device on the system, selects the driver with the highest relative capability based on a determined driver score, and provides identification information to a user confirmation and manual driver selection modification mechanism. A user is allowed to review and modify the identification information to produce selected information. The configuration mechanism configures the hardware devices based on the selected information provided by the user confirmation and manual driver selection modification mechanism. Advantageously, this embodiment of the present invention provides the user with the ability to make changes to identification information which were determined by the identification mechanism.

In another embodiment of the invention, the identification and configuration system is created in object-oriented programming language which is operating system-independent. Significantly, by implementing the identification mechanism in object-oriented libraries the present invention is independent of operating system. Also, a standard API is provided for creating applications which use the hardware identification and configuration mechanisms.

In another embodiment of the invention, this identification and configuration system is to be used as part of a hardware resource configuration manager for communicating, identifying, and configuring hardware devices.

In another embodiment of the invention, the hardware device is a network interface card, and the configuration mechanism also detects the available protocols which can used by the network interface card to communicate on the network. The configuration mechanism may present to the user the detected protocols for each hardware device and allow the user to revise or add to the configuration information. The configuration mechanism will then bind all of the appropriate protocols to the network interface card. Significantly, this allows the user to identify which protocol types are supported by the network interface card, and to correctly configure the various protocols which may be supported by the network interface card.

Advantageously, the identification mechanism is available for use by applications such as install programs, hardware monitoring processes, and network management software which require access to information concerning hardware devices, hardware configuration, and drivers on the computer system.

Another advantage of the present invention is that it is user-independent and widely available on all types of computer systems. Another advantage of the invention is that it selects the most appropriate available driver to support a particular hardware device guaranteeing the best possible system operations for a given set of drivers.

Another advantage of the invention is that it is backwards compatible with existing operating systems and hardware devices.

Notably, the protocol selection mechanism frees the user from having prior knowledge of network interface hardware in the computer system, no prior knowledge of the protocol types supported by the network interface hardware or network address to which the network interface is attached is required.

Significantly, this provides the user with the ability to modify installation information generated by the identification mechanism, and to enter in custom configuration for hardware instances which cannot be detected automatically.

Further features and advantages of the present invention as well as the structure and operation of various embodiments of the present invention are described in detail below with reference to the accompanying drawings. In the drawings, like reference numerals indicate like or functionally similar elements. Additionally, the left-most one or two digits of a reference numeral identifies the drawing in which the reference numeral appears first.

BRIEF DESCRIPTION OF THE DRAWINGS

This invention is pointed out with particularity in the appended claims. The above and further advantages of this invention may be better understood when taken in conjunction with the accompanying drawings, in which:

FIG. 2A is a hardware information table created by the identification mechanism of the present invention;

FIG. 2B is a driver information table created by the identification mechanism of the present invention;

FIG. 2C is a matched driver table created by the identification mechanism of the present invention;

FIG. 2D is an unmatched hardware device table created by the identification mechanism of the present invention;

FIG. 2E is an installation information table created by the identification mechanism of the present invention;

FIG. 3A is a syntax tree illustrating a preferred embodiment of the Hardware Instance (HIN) numbering convention for hardware device identification in accordance with the present invention;

FIGS. 3B–3D are a syntax tree illustrating a preferred embodiment of the HIN naming convention for hardware identification in accordance with the present invention;

FIG. 3E is a table listing examples of the HIN naming convention of the present invention illustrated in FIGS. 3B–3D;

FIG. 4 is a table of hardware identifiers recognized by different entities in the computer system;

FIG. 7 is a high-level flow chart of one embodiment of a hardware device identification and driver selection process of the present invention;

FIGS. 8A–8B are a flow chart of one embodiment of the primary bus hardware identification process of the present invention;

FIG. 9 is a flow chart of one embodiment of the peripheral bus hardware identification process of the present invention;

FIG. 12B is a table illustrating the subfields considered during the driver evaluation process for identifying peripheral bus hardware devices;

FIG. 12C is a table of product identifier weights for each subfield;

FIG. 15 is a flow chart of one embodiment of the user confirmation and manual driver selection modification process of the present invention;

FIG. 16A is a schematic diagram of an exemplary physical computer system; and

FIG. 16B is a schematic diagram of a virtual computer system created in accordance with the present invention, representing the physical computer system illustrated in FIG. 16A.

DETAILED DESCRIPTION

Figure 1A:
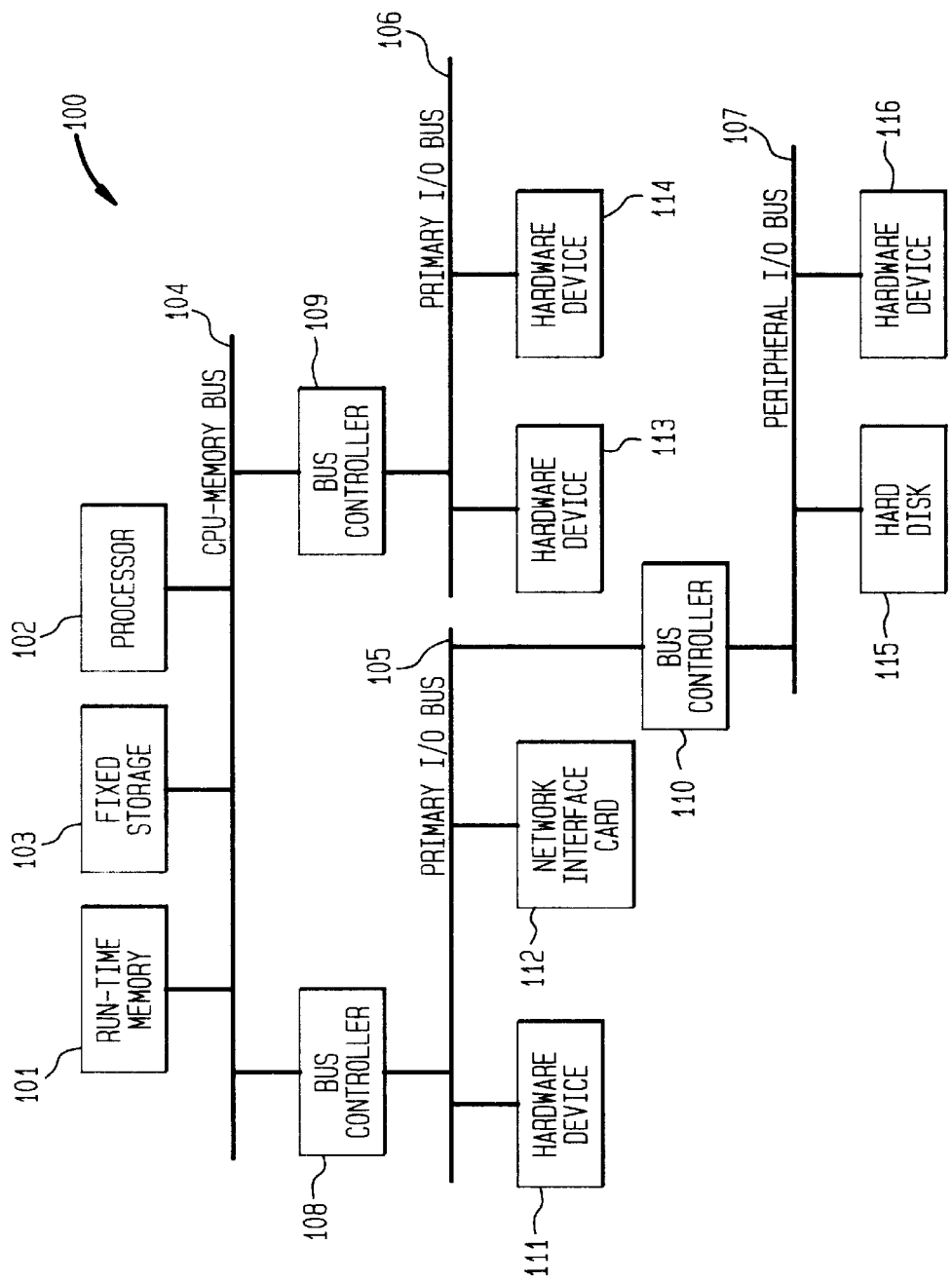
FIG. 1A is an architectural block diagram of an exemplary computer system wherein the identification and configuration system of the present invention may be implemented.

An architectural block diagram of a conventional computer system 100 in which the present invention may be implemented is shown in FIG. 1A. The computer system 100 includes a processor 102, a run-time memory device 101, and a fixed storage device 103, all of which are interconnected to each other through CPU-memory bus 104. The computer system 100 also includes a general storage media device such as hard disk drive 115, one or more bus controllers 108–110 interconnecting input/output (I/O) buses 104–107 directly or indirectly to CPU-memory bus 104.

In addition to the bus controllers 108–110 and hard disk drive 115, the computer system 100 may also contain additional hardware devices to expand the functionality of the system. The exemplary computer system 100 includes hardware devices 111–116, of which device 112 is identified as a network interface card solely for later reference. The devices 111–116 communicate through the buses 104–107 to exchange information and control signals.

As shown, several buses may be used in the computer system 100. A CPU-memory bus 104 is used to transfer information between the processor 102, run-time memory 101, storage device 103, and bus controllers 108 and 109. The I/O buses 105–107 are used to transfer information between the components connected to the CPU-memory bus 104 and the hardware devices 111–116 on the I/O buses. As shown, there may be one or more intermediate buses between communicating components and hardware devices.

In the following description the I/O buses shown in FIG. 1A are defined as primary buses and peripheral buses. Primary I/O buses can be expandable through the addition of primary or peripheral buses. Peripheral buses are characterized by being connected, directly or indirectly, to the CPU-memory bus 104 through bus controllers that actively manage the communication to the hardware devices on the bus.

The buses 105–107 may include any type of bus now or later developed. For example, the I/O buses 104–107 may be currently available I/O buses on Intel-based processor systems, such as SCSI, EISA, PCCARD, etc. These I/O buses have well-defined interfaces that are known in the art. The I/O buses may also be older "legacy" type buses such as ISA and IDE. In addition, the I/O buses 104–107 may also be newer bus types, such as PCI, that transfer information more quickly and support more advanced functions than legacy buses.

Bus controllers 108–110 serve to interconnect the buses 104–107, enabling devices and components on the buses to communicate with each other. The primary I/O buses 105–106 are connected to the CPU-memory bus 104 through bus controllers 108 and 109, respectively. The peripheral I/O bus 107 is connected to the primary I/O bus 105 through bus controller 110.

Hardware devices connected to a primary bus are referred to as primary bus hardware devices. In computer system 100, the primary I/O bus 105 has the hardware device 111 and network interface card 112 attached to it. Primary I/O bus 106, on the other hand, has hardware devices 113 and 114 connected to it. Examples of primary bus hardware devices include, for example, PCI, PnPISA, EISA, and PCCARD interface cards and IDE and SCSI bus controllers.

Peripheral I/O bus 107 also has hard disk 115 and hardware device 116 attached to it. Hard disk 115 and hardware device 116 are not directly addressed. Rather, the hardware devices are controlled through the bus controller 110. For example, if the peripheral I/O bus 107 is a SCSI bus, then the bus controller 110 would be a SCSI controller. Other peripheral bus hardware devices include, for example IDE-type hardware devices.

The computer system 100 may take on many alternative arrangements. For example, a hardware device may contain its own I/O buses, complicating the hardware device structure. Also, a physical hardware device may be functionally composed of more than one functional device, each performing operations independently of the other. In addition, a hardware device may be integrated within the system board. In some arrangements, hardware devices are installed in an expansion chassis that itself contains one or more buses. These buses are typically bridged to a primary I/O bus in the computer system 100 through an expansion slot.

As will be described below, the above and other arrangements prevent conventional computer systems from uniquely identifying the hardware devices, preventing the accurate assignment of drivers to support the devices. In accordance with the present invention, each of the functionally-independent hardware devices or subsystems of installed hardware devices are referred to as a hardware instance. As will be described in detail below, these hardware instances are assigned a reference numeral referred to as a hardware instance number (HIN) by the present invention that is unique in the computer system 100 regardless of the location of the hardware instance in the system.

An operating system is physically stored on the fixed storage device 103 and the hard disk drive 115. The fixed storage device 103 in an Intel-based system may be, for instance, a programmable read-only memory (PROM) chip on the system board. The storage device 103 contains a portion of the operating system, referred to as the Basic Input Output System (BIOS) in Intel-based systems, that provides an interface between the operating system, hard disk drive 115 and bus controller 110. BIOS generally supports a limited number of hardware devices. A more extensive portion of the operating system which supports a greater number of hardware devices is stored on the hard drive 115.

The operating system is loaded into run-time memory 101. Parameters for accessing the hard disk drive 115 are also located within the storage device 103, to be used by the processor 102 to reference the hard disk drive 115 upon system bootup. After the operating system has been loaded from hard disk drive 115, one or more drivers which are stored on the hard disk drive 115 are loaded into memory 101 in accordance with the present invention for the purpose of providing access to the additional hardware devices 111–114 and 116.

Figure 1B:
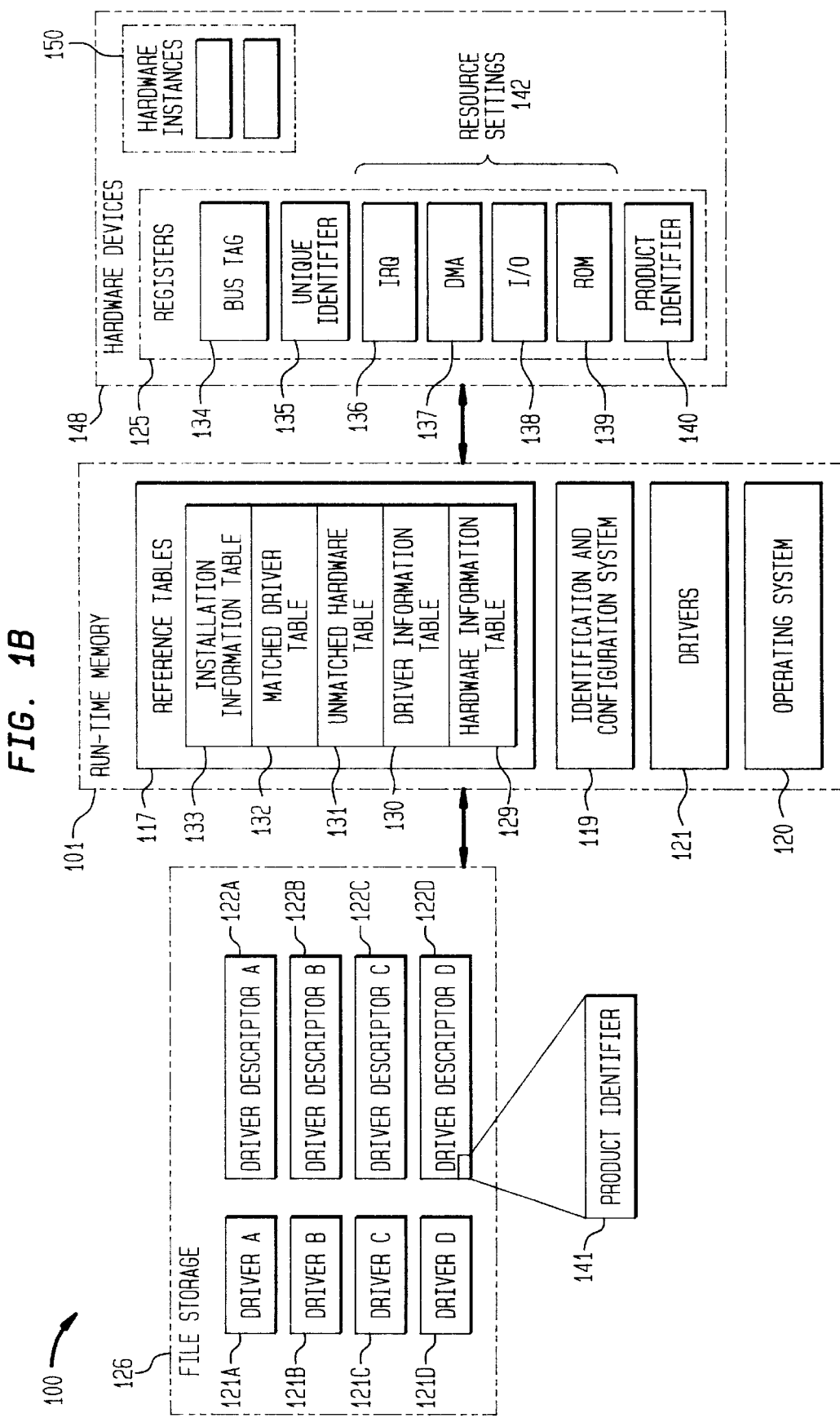
FIG. 1B is a functional block diagram of the computer system illustrated in FIG. 1A implementing the identification and configuration system of the present invention.

FIG. 1B is a functional block diagram of the computer system 100 implementing one embodiment of the identification and configuration system of the present invention. During operation, the computer system 100 generally includes the operating system 120 loaded in run-time memory 101. The hard disk drive 115 stores a number of drivers 121A–121D (generally and collectively referred to as drivers 121). As shown in FIG. 1A, access to the hard disk drive 115 is provided through the bus controller 110.

The operating system 120 and one or more drivers 121 are loaded from hard disk 115 into run-time memory 101. When loaded, the drivers 121 shield the operating system 120 and application programs (not shown) from the complexities of the associated hardware instances 150 hardware devices 111–116 shown generally in FIG. 1B as hardware devices 148. Also, the identification and configuration system 119 of the present invention is preferably a software program that is loaded into memory 101 and executed in a well-known manner by the processor 102.

Generally, there is a one-to-one correspondence between a driver and a hardware device. For example, a .HAM (Host Adapter Module) driver may be loaded into run-time memory 101 first, say for a bus controller, and a .CDM (Custom Device Module) driver may then be loaded to be used with a hardware device on the I/O bus controlled by the bus controller. For instance, there is a Novell driver named PS2I.HAM for use with a IBM SCSI (MicroChannel) bus controller type which would be used with a MicroChannel bus controller, and for communications with a MicroChannel CDROM device on the MicroChannel I/O bus, a different driver is provided, named CDSCI.CDM.

However, there are exceptions to this one-to-one correspondence. For example, there are what are referred to in the art as .DSK drivers. .DSK drivers are monolithic drivers; that is, a single driver controls a peripheral bus controller and all of the peripheral devices attached to the I/O bus associated with that bus controller. An example of a .DSK driver in NetWare is the ISADISK driver which is used to access an ISA storage I/O bus controller and all of the attached storage devices.

The drivers 121 are associated with what are referred to in the art as driver descriptor files 122A–122D (generally and collectively referred to as descriptors 122). Each of the descriptor files 122 include information describing an associated driver. As will be described below, the descriptor files 122 are accessed by the identification and configuration system 119 of the present invention to obtain driver information, including a product identifier 141. The product identifier 141 contains information specifying the specific hardware devices 148 that the associated driver 121 can support. Specifically, the product identifier 141 is generally a text string comprising codes that correspond to information such as vendor and product revision information of the hardware device(s) supported by the associated driver 121.

There are several different types of descriptor files 122. In a preferred operating environment, the drivers 121 are Novell-certified device drivers. The associated descriptors 122 in such an embodiment are .LDI and .DDI driver descriptor files. In an alternative arrangement, the operating system 120 is a Windows operating system. In this embodiment, the product identifier 141 is contained in a .INF type driver descriptor file 122. As will be described below, the product identifier 141 is used by the identification and configuration system 119 to select a particular driver 121 to support each of the installed hardware instances 150.

The hardware devices 148 have registers 125 for storing hardware device and instance information, including a bus tag 134, a unique identifier 135, resource settings 142, and a product identifier 140. The bus tag 134 is a unique number that identifies the I/O bus in the computer system 100 to which hardware device 148 is connected. The unique identifier 135 is a number associated with the I/O bus identified by the bus tag 134 which uniquely identifies the hardware device 148 on the I/O bus.

There are a number of resource settings 142 that are stored in registers 125. These resource settings 142 include interrupt (IRQ) 136, direct memory access (DMA) 137, input/output (I/O) 138, read-only-memory (ROM)/random-access-memory (RAM) 139 settings. These resource settings allocate system resources to a hardware instance 150, such as a block of memory or an assignment of a communication channel. Resource settings 142 are required information when loading a driver 121 into run-time memory 101. As discussed below, the resource settings 142 are used by the present invention to resolve conflicts between hardware instances 150. Each of the resource settings 142 is described briefly below.

An IRQ is a signal to the processor 102 in the computer system 100 from a hardware device 148 under processor 102 control. Abbreviated IRQ for Interrupt ReQuest, there are additional hardware lines on the I/O bus that carry the signal to the processor 102. These hardware lines are required for every hardware device in the computer system 100. An ISA bus, for example, has sixteen IRQs, numbered 0 to 15, available. Each hardware device 148 is required to have a unique IRQ setting 136 associated with it except in the case of shared interrupt devices.

DMA is a quick method for transferring information from a storage device into memory 101 without passing information through the processor 102. Because the processor 102 is not involved in the transfer of information, there is good transfer performance. However, a DMA setting 137 must be unique to each hardware device 148.

I/O describes the transfer of data between the processor 102 and the hardware device 148. Disk drives, printers, tape storage systems, and CDROM drives are examples of I/O devices. A unique hexadecimal number referred to as an I/O port number 138 describes a particular I/O port location for transferring information between the processor 102 and each hardware device 148.

ROM (Read Only Memory) addresses are required for those hardware devices which store their own executable code within the hardware device 148. RAM (Random Access Memory) addresses are required for hardware devices 148 that present additional memory into the system for I/O purposes. Similarly, a ROM or RAM address setting 139 must be unique for each hardware device 148.

The product identifier 140 contains information such as device type, vendor identification, product identification, revision, etc. that identify a particular hardware device 150. As will be explained in detail below, the identification and configuration system 119 utilizes the product identifier 140 to optimally associate a driver with a particular hardware instance 150.

The identification and configuration system 119 creates reference tables 117 in run-time memory 101 for storing calculated and retrieved information that is used to select the optimal driver to associate with each hardware instance 150 in the computer system 100. A hardware information table 129 includes information related to each of the hardware instances 150. A driver information table 130 includes driver identification information obtained from the driver descriptors 122. An unmatched hardware table 131 and a matched driver table 132, described below, are tables used by the identification and configuration system 119 during the identification of the hardware instances 150. An installation information table 133 is used by the identification and configuration system 119 of the present invention to configure the hardware instances 150. Each of these tables is described in detail below.

The identification and configuration system 119 uses this information to associate a driver 121 with a hardware instance. Specifically, the identification and configuration system 119 prioritizes the drivers 121 based upon a number of factors indicative of the drivers' respective capability to support a particular hardware instance 150. The identification and configuration system 119 selects the driver 121 with the highest relative capability to be used with the hardware instance 150.

FIGS. 2A–2E illustrate one embodiment of the reference tables 117 that the identification and configuration system 119 creates to store and maintain data to select the optimal driver 121 in accordance with the present invention. The identification and configuration system 119 retrieves hardware device information from the registers 125 in the hardware devices 148 and driver information from the driver descriptors 122. The identification and configuration system stores this information in the reference tables 117 in run-time memory 101.

Referring to FIG. 2A, the Identification and configuration system 119 creates a hardware information table 129 for storing hardware instance information retrieved from the hardware devices 148. The hardware information table 129 includes product identifier information 140 specifying the particular hardware instance, resource settings 142 for identifying the system resources required by the hardware instances 150 and hardware identifier information 201 identifying the hardware instance in accordance with the present invention. The identification and configuration system 119 creates a record 240 in the hardware information table 129 for each hardware instance 150 identified in the computer system 100.

The resources settings 142 include fields for the IRQ 136, DMA 137, I/O port 138 and ROM/RAM 139 resource settings described above. The product identifier 140 is obtained from the hardware devices 148, and is parsed to store the following data items in separate hardware information table fields. A model ID 224 identifies the model of the associated hardware instance 150. A vendor ID 225 identifies the vendor of the hardware instance 150. A vendor device ID 226 identifies the device number of the hardware instance 150 assigned by the vendor.

Figure 12A:
FIG. 12A is a table illustrating the subfields considered during the driver evaluation process for identifying primary bus hardware devices.

A subvendor ID 227 identifies the vendor which manufactures the particular chip or hardware component in the hardware instance 150. A subvendor device ID 228 identifies the vendor-assigned device number for the components of the hardware instance 150. A product revision 229 identifies the version of the hardware instance 150. In accordance with the present invention, one or more of these subfields of the product identifier 140 are used to identify the hardware instance 150, depending on the bus type 223 of the hardware instance 150. FIGS. 12A and 12B, discussed in detail below, list the data items of the product identifier 140 that are recognized by the hardware instances 150 that operate on different bus types.

The hardware identifier field 201 is configured in accordance with the present invention to include subfields for information which uniquely identifies each hardware instance 150 in the computer system 100. A hardware instance (HIN) number 222 generated in accordance with the identification and configuration system 119 uniquely identifies each hardware instance 150 in every hardware device 148 installed in the computer system 100. As noted, the bus tag 134 identifies the I/O bus to which the hardware instance 150 is attached. The unique identifier 135 uniquely identifies the hardware device on the I/O bus identified by the bus tag 134. In a preferred embodiment of the present invention, the HIN number 222 is generated based upon the bus tag 134 and unique identifier 135. This is preferred in that it takes advantage of the combination of these two values being currently available within the computer system 100. However, it will be understood by those skilled in the art that other techniques for uniquely assigning reference numerals to the hardware instances 150 may be used.

Referring to FIG. 2B, the identification and configuration system 119 creates a driver information table 130 for storing driver information retrieved from the driver descriptor files 122. The driver information table 130 includes product identifier 141 information specifying the specific hardware instances 150 that the associated driver 121 can support, and driver identification information 299 specifying the identity and location of the associated driver 121.

Specifically, the identification and configuration system 119 retrieves and parses the driver product identifier 141, placing the pertinent data items into the driver information table subfields. The identification and configuration system 119 creates records 241 in the driver information table 130 for each driver 121 stored in the file storage 126.

The product identifier 141 subfields include the bus type 223, model ID 224, vendor ID 225, vendor device ID 226, subvendor ID 227, subvendor device ID 228, and product revision 229, all of which are described above with reference to the hardware information table 129. In addition, the product identifier 141 includes an optional exclude indicator 209. This field enables the user to specify whether the driver represented by the record 241 is to be included in the driver selection process discussed below.

The driver information field 299 includes a driver name field 207 and driver location field 208. The driver name 207 is the file name of the driver 121 in file storage 126. The driver location 208 is the location of the file in file storage 126.

As will be explained in detail below, the identification and configuration system 119 of the present invention determines the optimal driver 121 for a particular hardware instance 150 by comparing various characteristics of all the drivers that are capable of supporting the hardware instance. To determine which drivers 121 can support a particular hardware instance, the identification and configuration system 119 compares the information in each driver record 241 with that in the hardware device records 240. This process identifies drivers 121 that can support the particular hardware instance 150.

When such a driver 121 is identified, information about the driver 121 is stored in a matched driver table 131 associated with the particular hardware instance 150 and shown in FIG. 2C. As shown, the matched driver table 131 includes the same driver information stored in the driver information table 130 and described above. In addition, this table includes a score 260 generated in accordance with the present invention. The score 260 includes a value representing the degree of compatibility or appropriateness of the identified driver 121 to support a particular hardware instance 150. As will be explained in detail below, this value is preferably the sum of a series of factors, each weighted in accordance with the degree to which the factor reflects a driver's compatibility or appropriateness to support a particular hardware instance 150.

When determining the optimal driver assignment, the identification and configuration system 119 also identifies hardware instances 150 for which there are no drivers 121 in the system 100. If the identification and configuration system 119 does not find a driver 121 which can support the particular hardware instance 150, the hardware information associated with that hardware instance 150 is placed in the unmatched hardware instance table 132 shown in FIG. 2D. The unmatched hardware instance table 132 includes same the hardware information stored in the hardware information table 129 described above.

Once an optimal driver 121 is selected, the identification and configuration system 119 places installation information for the selected driver into an installation information table 133 shown in FIG. 2E. The installation table 133 includes such information as the driver name 207, driver location 208, resource settings 142, and HIN number 222. The identification and configuration system 119 uses the installation information table 133 to configure the hardware instance 150 in a manner described below.

Figure 3D:
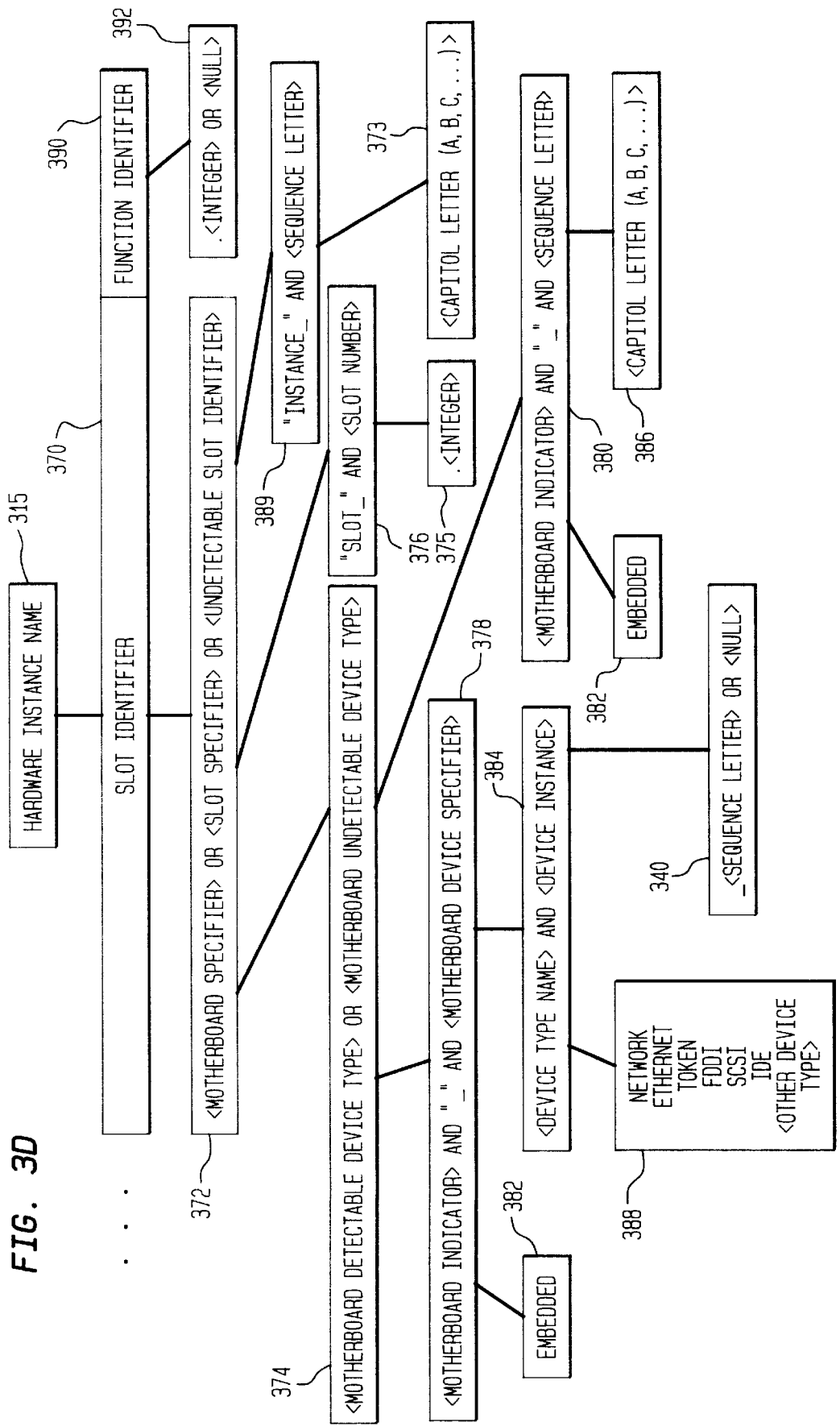

The hardware instance (HIN) naming and numbering convention of the present invention is described below with reference to FIGS. 3A–3D. FIG. 3A illustrates one embodiment of the HIN numbering convention of the present invention for producing the HIN number 222 that is unique for the entire computer system 100. FIGS. 3B–3D illustrate one embodiment of the HIN naming convention of the present invention for producing an HIN name 315 that is associated with a HIN number 222 and that is also unique for the entire computer system 100.

Referring to FIG. 3A, the HIN number 222 has a format 304 which is a single numerical value referred to as an instance number. The format 306 of the instance number 304 is determined by the uniqueness of the physical slot number which has been assigned to the slot, if any, in which the hardware instance is located. As noted, the physical slot number is assigned by the operating system 120.

The instance number format 306 includes only the physical slot number when the physical slot number assigned by the operating system 120 is system-unique. The value 308 of the physical slot number(306) is simply an integer value. When the physical slot number assigned by the operating system 120 is not unique within the system 100, the format 306 of the instance number includes the (non-unique) physical slot number and a sequence number assigned in accordance with the present invention.

The physical slot number may not be unique because the operating system 120 assigns the same slot number to two or more hardware instances or because an arbitrary value is assigned by the operating system when no physical slot number can be obtained (such as system board devices). This combination of slot and sequence number in the HIN numbering convention results in a system-unique hardware instance number 222 in these circumstances.

If multiple hardware instances are associated with the same physical slot, the hardware instance number 222 chosen for each hardware instance is X0Y, where X is the physical slot number, and Y is a sequence number. If a single instance is associated with a physical slot, the hardware instance number 222 chosen for that device will simply be X, where X is the physical slot number. If there are multiple I/O buses that have overlapping slot numbers, one of the I/O buses will use the physical slot number X, and the others will have an X0Y number for the overlapping slots, to guarantee uniqueness. If no physical slot can be obtained for a hardware instance, a number in the range 10000+Y where Y is a sequence number, will be chosen.

The physical slot number has a value 310 which is an integer. Likewise, the value 314 of the sequence number will also be an integer. Preferably, a separator is interposed between the physical slot number and the sequence number to assist in the identification of such values. The separator will have a value 312 which is any character that may be useful in distinguishing between the slot and sequence numbers. In a preferred embodiment of the present invention, the value 312 of the separator is 0.

This HIN numbering convention provides a system-unique reference numeral that is not provided by conventional identification and configuration systems. For example, conventional approaches simply associate the hardware devices 148 to a physical slot. Instances installed in a slot that has a physical slot number that cannot be obtained by the operating system 120 are all assigned a single physical slot number (typically zero).

For example, a physical slot number cannot be obtained for multiple hardware instances attached to a PnPISA bus. In this case, PnPISA hardware instances will have physical slot numbers of zero. This non-unique hardware identification causes the above-noted problems such as computer system errors or corrupt data. The HIN numbering convention of the present invention assigns PnPISA hardware instances HIN numbers 222 having physical slot values greater than 10000 with a sequence number, thereby avoiding the noted drawbacks.

Conventional physical slot numbering approaches also yield a non-unique value when the hardware device installed in a physical slot has a bridge with a subordinate bus and multiple hardware instances. Rather than assigning a single physical slot number as done in conventional techniques, the present invention implements the above-noted sequence numbering to uniquely identify each of the hardware instances located on the one hardware device.

Yet another circumstance in which conventional slot numbering approaches yield non-unique hardware instance numbers occurs when a physical device is composed of more than one hardware instance. In this case, since the physical device is installed in a single slot, the same physical slot number is assigned to all instances within the physical device in conventional techniques. In contrast, the present invention assigns unique sequence numbers to each hardware instance, alleviating the problem of non-unique identification numbers.

For example, in a computer system with five slots having five hardware instances which are identifiable through software, the five hardware instances would have HIN numbers of 1, 2, 3, 4, and 5. However, in the case wherein the hardware device 1 had two hardware instances, the associated HIN numbers 222 for the sequence would be 101, 102, 2, 3, 4, and 5. Note that there are six hardware instances in this example. In another case wherein the same system has an additional hardware instance integrated on the system board, the associated HIN numbers 222 would be 101, 102, 2, 3, 4, 5 and 10001. The 10001 identification number is used to identify the system board hardware instance.

The hardware instance (HIN) naming convention of the present invention will now be described with reference to FIGS. 3B–3D. The components of the hardware instance name 315 include a chassis identifier 350, a bus identifier 360, a slot identifier 370 and a function identifier 390.

The chassis identifier 350 is included in the hardware instance name 315 for a hardware instance 150 in an external expansion chassis. Examples of this are PCI devices in an expansion chassis. The format 352 of the chassis identifier 350 includes the text string "CHASSIS_" followed by the chassis number. The chassis number has a value 354 that is an integer. In computer systems 100 wherein such an expansion chassis is not present, the chassis identifier 350 is not included, as shown by the null format 352.

The bus identifier 360 specifies the I/O bus through which the given hardware instance is attached. The format 362 of the bus identifier 360 includes a bus type followed by a bus instance number. The bus type value 364 includes ISAPNP, EISA, MCA, PCI, PCCARD, CARDBUS, and others. The bus instance number value 366 is either an integer value, with each value assigned to a different multiple instance of a particular bus type; or null when there is only one bus of a particular bus type.

The slot identifier 370 specifies the physical location of a given hardware instance, either in a physical slot or embedded on the system board.

The format 372 of the slot identifier 370 includes a motherboard specifier or a slot specifier followed by an undetectable slot identifier. The motherboard specifier is used to identify motherboard devices. The slot identifier and slot number are used to identify instances other than motherboard hardware instances. The motherboard specifier format 374 could be either a motherboard-detectable device type or a motherboard undetectable device type. The motherboard detectable device type format 378 includes a motherboard indicator followed by an underscore "_" which is further followed by a motherboard device specifier. The motherboard indicator value 382 as implemented for a motherboard device is the "EMBEDDED" text string. The motherboard device specifier format 384 includes a device type name and a device instance. The device type name value 388 includes NETWORK, ETHERNET, TOKEN, FDDI, SCSI, IDE, and other device types. The device instance value 340 is defined as an underscore "_" followed by a sequence letter. When there is only one hardware instance of a particular device type name, the device instance value 340 is null.

The motherboard undetectable device type (format 374) has a format 380 that includes a motherboard indicator followed by an underscore "_" and a sequence letter. The motherboard indicator value 382 for a motherboard device is the "EMBEDDED" text string. The sequence letter value 386 is a capital letter such as A, B, C, etc.

The slot specific (format 372) format 376 includes A "SLOT_" text string followed by a slot number. The slot number value 375 is an integer. The undetectable slot identifier (format 372) format 389 is the text string "INSTANCE_" followed by a sequence letter. The value 373 of the sequence letter is a capital letter.

If the physical location of the hardware instance is not detectable through a bus interface then the slot identifier will name the hardware instance generically using the aforementioned undetectable slot identifier field value 389 and the user is notified. The user is given the opportunity of associating the generic hardware instance name with the physical location of the hardware device. Examples of interface cards for which no physical slot number can be obtained through software are Plug and Play ISA cards and PCI cards in a system with PCI BIOS v2.0.

The function identifier 390 names the external channels which may be associated with a hardware instance. Examples of this are multiple port SCSI or Ethernet cards. The value 392 of the function identifier 390 is either an integer preceded by a period "." or, in hardware instances wherein such external channels are not present a null value (not present).

FIG. 3E is a table illustrating a number of exemplary hardware instance and bus arrangements and the resulting hardware instance name 315 assigned in accordance with the present invention. These examples may be followed by using the naming convention approach described above and illustrated in FIGS. 3B–3D. Take, for example, the HIN name "PCI.EMBEDDED_SCSI_A" shown in FIG. 3E. There is no chassis identifier 360 since the prefix "CHASSIS" is not included in the HIN name. That is, the identifier in the example does not refer to a device found in a chassis. The bus identifier 350 includes the "PCI" string indicating that the bus type (362) is PCI (364). Since the bus instance number (362) is null (366), there is only one PCI bus at the same bus hierarchy level in the computer system 100. The slot identifier 370 includes the "EMBEDDED" string (382) indicating that the device is installed on the motherboard (378, 374, 372). Also, the "SCSI" string (388) indicates that it is a SCSI device (384, 378, 374, 372). Because of the presence of the SCSI device type name (384), the device is known to be a motherboard detectable device (374) rather than a motherboard undetectable device type. The character "A" is a sequence letter (340) indicating that the device is the first device of multiple PCI motherboard devices that are SCSI devices.

FIG. 4 is a table illustrating the manner in which different entities in the computer system 100 perceive and reference the hardware instance name and number of the present invention. These entities include the hardware instances 150, the identification and configuration system 119, the operating system 120, driver descriptors 122 and the user. Significantly, the identification and configuration system 119 performs associations between information recognized by these entities in a manner which does not alter the manner in which the hardware instances 150 are referenced by any of these entities. Accordingly, the HIN numbering and naming conventions of the present invention may be utilized by current and future entities, making the present invention backwards compatible.

To clarify this feature of the present invention, the above entities are divided into two categories, those that are HIN-aware and those that are non-HIN-aware. HIN-aware entities are entities which recognize HIN number 222 and HIN name 315. Non-HIN-aware entities are entities which do not recognize HIN number 222 and HIN name 315, and thus use existing techniques for identifying hardware.

Referring to column 401, the hardware instances 150 are identified using the bus tag 134, unique identifier 135 and product identifier 140 stored in the registers 125. As shown in column 402, the identification and configuration system 119 generates an associated HIN number 222 and HIN name 315, associating the combination of bus tag 134 and unique identifier 135 to the HIN number 222 and HIN name 315. The identification and configuration system 119 may use the HIN number 222 and HIN name 315 interchangeably.

Referring to column 403, the drivers 121 use the HIN number 222, product identifier 140, bus tag 134 and unique identifier 135 if the driver is a HIN-aware driver. If not, the driver treats the HIN number 222 as a physical slot number.

Referring to column 404, the driver descriptors 122 recognize the product identifier 141. The driver descriptors 122 do not recognize or use the HIN name 315 and numbering the present invention.

Referring to column 405, the operating system 120 recognizes the HIN number 222 as the identification number for the hardware instance 150 if the operating system is an HIN-aware operating system. If not, the identification and configuration system 119 presents the HIN number 222 as a physical slot number to the operating system. The non-HIN-aware operating system treats the HIN number 222 as a physical slot number.

Referring to column 406, the user sees the HIN name 315 if the operating system is HIN-aware. The HIN name, as discussed above, is more informative for a user than a physical slot number assigned in accordance with the present invention. When the operating system 120 is non-HIN-aware, the user is presented a physical slot number, which is actually the HIN number 222.

Figure 5:
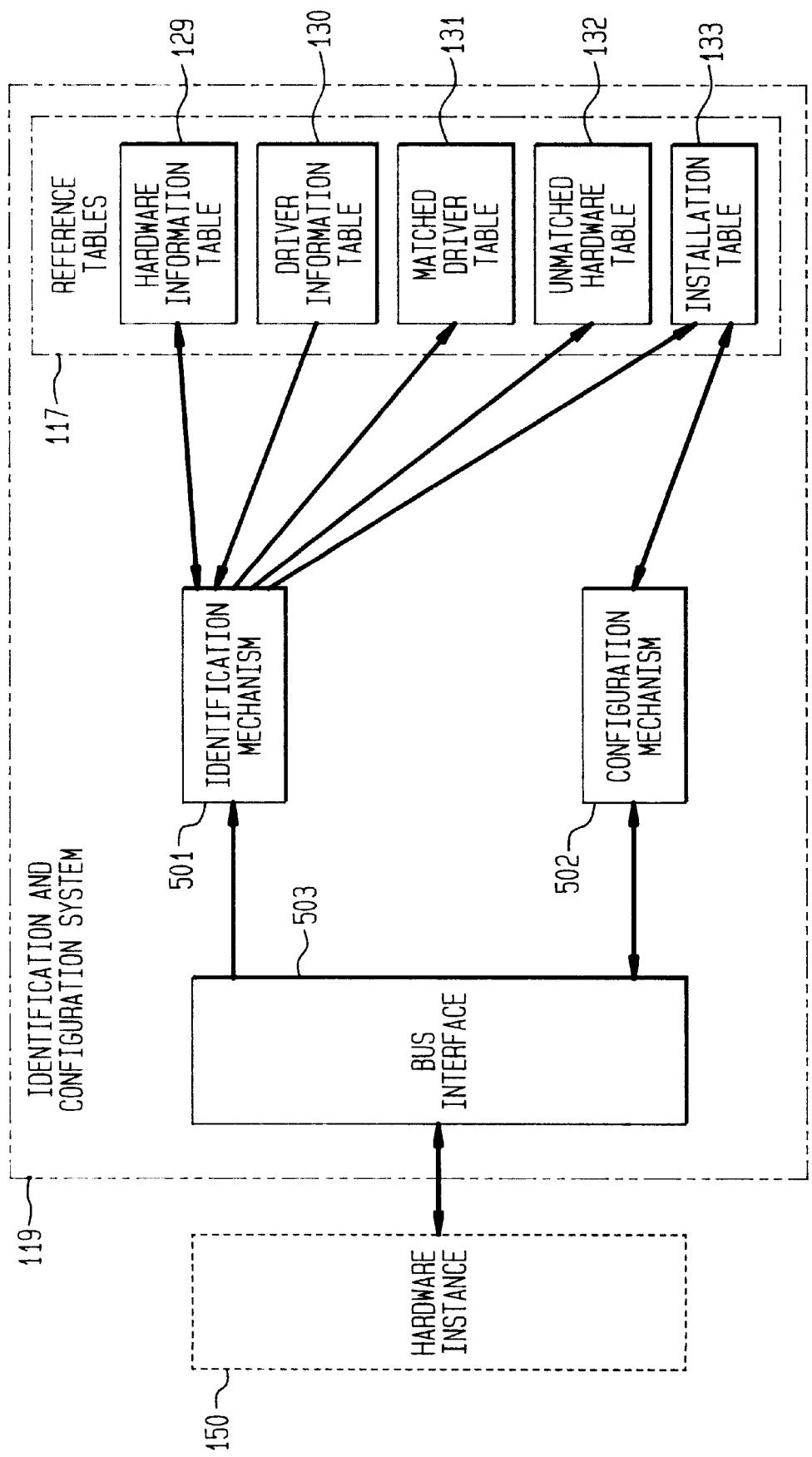
FIG. 5 is a functional block diagram of one embodiment of the identification and configuration system of the present invention.

A functional block diagram of a preferred embodiment of the identification and configuration system 119 of the present invention is depicted in FIG. 5. The identification and configuration system 119 generally includes an identification mechanism 501, a configuration mechanism 502, and a bus interface 503.

The identification mechanism 501 includes means for uniquely identifying the hardware instances 150 in the computer system 100. In a preferred embodiment, the identification mechanism 501 also includes a means for determining the drivers' relative capability to support a particular hardware instance 150. This capability is preferably represented by a single value derived from driver and hardware instance information located in the driver information tables 130 and hardware device information tables 129. This value is preferably the sum of a series of factors weighted in accordance with the degree to which the factor reflects a driver's compatibility or appropriateness to support a particular hardware instance 150. In one preferred embodiment, the factors include the vendor, model, version and other information contained in the product identifiers 140 and 141. The factors, their weights and the determination of the value representing each driver's capability to support a particular hardware instance is described below.

The identification mechanism 501 also includes a means for selecting the optimal driver among the drivers 121 that can support the particular hardware instance. This determination is based upon the above-noted relative capability of the drivers 121 to support that particular hardware instance. The identification mechanism also generates installation information for the selected driver 121.

The configuration mechanism 502 configures the hardware devices 150 by loading the selected optimal driver 121 into the run-time memory 101 of the computer system 100. The configuration system 502 includes means for receiving the installation information from the identification mechanism 501 and using the information to configure the hardware instances 150. Preferably, the configuration mechanism 502 also includes means for resolving conflicts with other hardware instances. In one embodiment, this determination is based upon system resource requirements of the hardware instances 150. In another embodiment, the configuration mechanism 502 saves installation information for restart of the computer system 100. This information is preferably obtained from the hardware devices 148. Specifically, this information is located in the resource settings 142 subfields in the hardware information table 129.

As shown in FIG. 5, bus interface 503 provides access to hardware instances 150 for obtaining information from, and setting information in, the hardware devices 148. The bus interface 503 may be any well-known bus interface that accesses the installed hardware devices registers 125. In a preferred embodiment, the bus interface 503 is NetWare Bus Interface (NBI) available from Novell Incorporated, Provo, Utah. In an alternative embodiment, the bus interface 503 includes well-known lower-level functions. For example, when the hardware device 148 is an IDE bus controller, the hardware instance information is obtained by performing an IDE identify operation. When the hardware device 148 is a SCSI bus controller, information is obtained through a SCSI inquiry. Hardware identification using these methods is well known in the art. It should be understood that multiple techniques currently exist for obtaining hardware device information and thus, various techniques to obtain information may be used without varying from the scope of the present invention.

Figure 6:
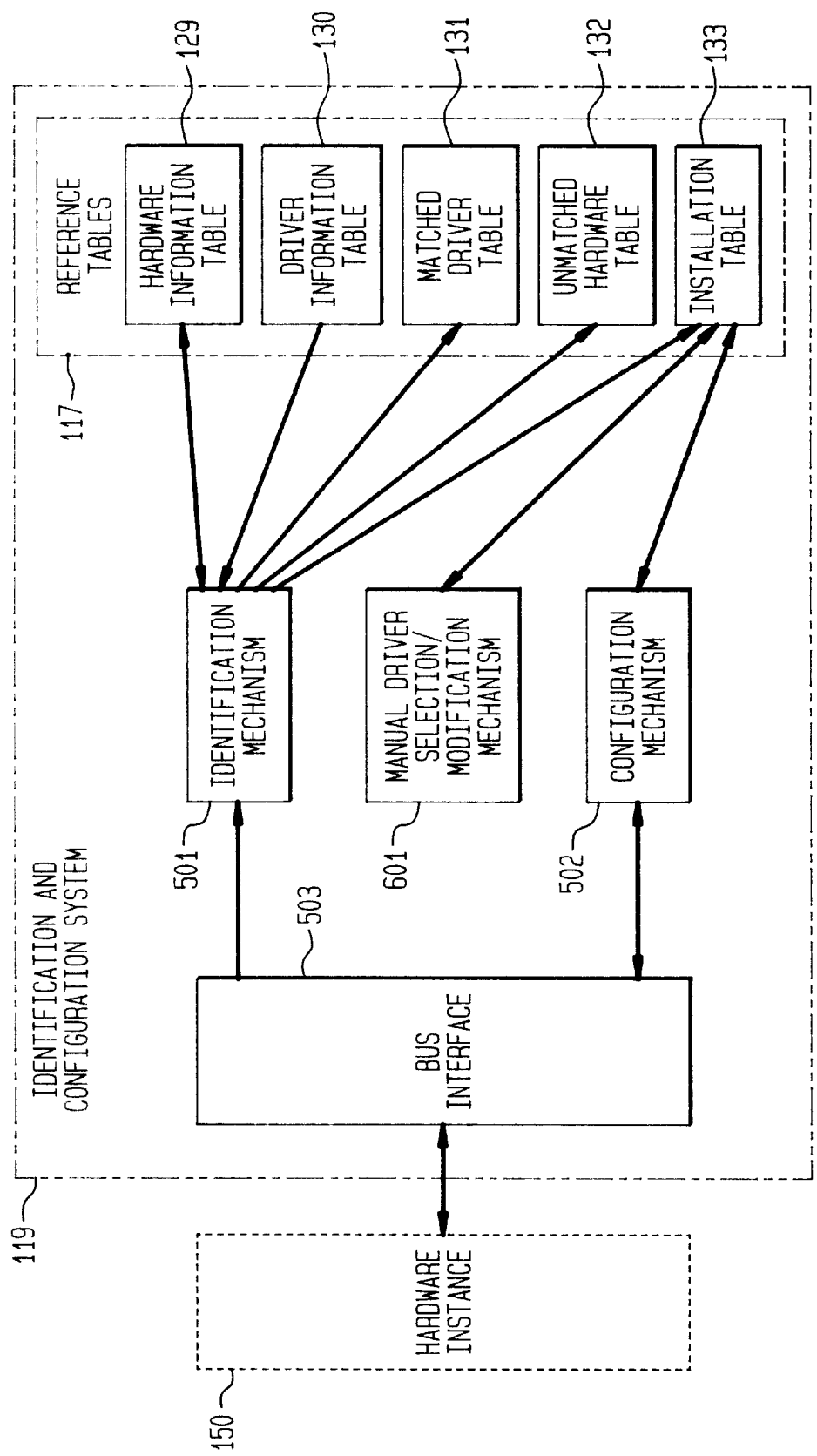
FIG. 6 is a functional block diagram of another embodiment of the identification and configuration system of the present invention.

Another preferred embodiment of the identification and configuration system 119 is shown in FIG. 6. In this embodiment, a manual driver selection modification mechanism 601 is included for allowing a user to review and modify the installation information table 133. The reviewed installation information table 133 is provided to the configuration mechanism 502 for configuring the hardware instances 150. Significantly, this provides the user with the ability to modify installation information generated by the identification mechanism 501, and to enter in custom configuration for hardware instances which cannot be detected automatically.

The process performed by the identification mechanism 501 will now be described with reference to FIG. 7. As discussed previously, the identification process 700 identifies all hardware instances in the computer system 100 and optimally associates drivers to each of the hardware instances 150. Process 700 begins at block 702 as part of the identification and configuration system 119. Once invoked, the identification process 700 advances to block 704 where at the bus interface 503 is loaded into run-time memory 101 to enable the present invention to obtain hardware instance information from the hardware devices 148. As discussed, the bus interface 503 consists of processes which can read and write information to the registers 125 of the hardware devices 148.

Once the bus interface 503 is loaded at block 704, the identification process 700 transfers control to a device driver identification block 706. At block 706 the identification and configuration system 119 obtains information about the drivers 121 which is available on the file storage 126 of the computer system 100. The identification and configuration system 119 stores the retrieved information in the driver information table 130. As discussed above, the driver information table 130 is used when determining the optimum driver to support each of the hardware instances 150.

At the primary bus hardware identification block 708, the identification and configuration system 119 identifies hardware instances located on primary buses such as primary I/O buses 105 and 106 illustrated in FIG. 1A. If there are primary I/O buses which are bridged to other buses, the process in block 708 is repeated for these buses as well.

As discussed, the bus interface 503 is used to obtain information from the hardware devices 148. This information is entered in the hardware instances information table 129. Specifically, the bus tag 134 and unique identifier 135 are obtained for the hardware devices 148 in system 100. A HIN name 315 and HIN number 222 are determined for each identified hardware instance. Once all the hardware instances are identified and the associated information is entered into the hardware information table 129, the optimal driver 121 is selected. The driver selection process 700 excludes certain drivers 121 such as currently running drivers supporting bus controllers currently loaded in memory 101 and hardware devices 148 that cannot be identified through standard bus mechanisms. The primary bus hardware identification process of the present invention is described in detail below with reference to FIG. 8.

At peripheral bus hardware identification block 710, identification and configuration system 119 identifies the remaining hardware instances located in the computer system 100. That is, those hardware instances located on peripheral buses such as peripheral I/O bus 107. The peripheral bus hardware identification process is performed as necessary, depending on the number of peripheral bus controllers identified during the primary bus hardware identification process at block 708. It is noted that drivers 121 for the primary bus hardware devices must be loaded before peripheral hardware devices can be identified.

Peripheral hardware devices primarily include devices on the SCSI and IDE buses. The bus interface 503 is used to obtain information from the hardware devices 148. This information is entered into the hardware information table 129. In the case for SCSI or IDE devices mentioned above, hardware information is obtained through the well-known SCSI inquiry and IDE identify functions of the bus interface 503. The identification and configuration system 119 selects an optimal driver to support a particular hardware instance. The peripheral bus hardware identification process of the present invention is described in detail below with reference to FIG. 9.

At end block 712 information generated from the performance of blocks 708 and 710 is entered in the installation information table 133. This information 133 is made available for use to the configuration mechanism 503 or other interested entity such as the operating system 120.

The primary bus hardware identification process 800 of the present invention performed at block 708 will now be described in detail with reference to the flow chart illustrated in FIGS. 8A and 8B. As noted, the bus interface 503 has been loaded and the drivers 121 have been identified prior to the performance of the primary and peripheral bus hardware identification processes. The primary bus hardware identification process 708 begins at start block 801. This process is invoked in a well known manner by the identification and configuration system 119 of the present invention, although this process may be implemented to support any process or system that requires identification of primary bus hardware instances and the automatic assignment of an optimal driver to the discovered hardware instances. Control is then transferred to process 800 at block 801.

At block 802, the primary buses are located and scanned for hardware instances 150 using the bus interface 503. In the embodiment wherein the bus interface 503 is NBI, the ScanBusInfo( ) and ScanCardInfo( ) methods are preferably used to iteratively search the primary buses for hardware instances 150 in a well-known manner. When provided with an initial sequence number value of −1, the ScanBusInfo( ) and ScanCardInfo( ) methods provide the first hardware instance 150 detected in the computer system 100. On subsequent searches, the sequence number from the previous search is provided as input for the next search performed by the ScanBusInfo( ) and ScanCardInfo( ) methods. The ScanCardInfo( ) method then retrieves the next hardware instance 150 in the computer system 100. The ScanCardInfo( ) method is used to obtain all of the hardware instances in the computer system 100 without having to discover the individual I/O buses that the ScanBusInfo( ) method discovers. Hence, a nested search loop for each I/O bus 105, 106 by the ScanBusInfo( ) method and hardware instance 150 by the ScanCardInfo( ) method is required. As noted, it should be understood that in other embodiments other types of bus interface 503 may be implemented. As one skilled in the relevant art would find apparent, in such embodiments a call would be made to the appropriate procedure(s) to obtain the above-noted hardware instance information.

At block 804, the identification and configuration system 119 assigns a unique HIN number 222 to hardware instances 150 discovered at block 802. The identification and configuration system 119 executes functions implementing the HIN name 315 and HIN number 222 syntax illustrated in FIGS. 3A–3E. In one embodiment, these functions are performed by the bus interface 503. In such an embodiment, a function GetInstanceNumber( ) is preferably provided to generate the HIN number 222 given a bus tag 134 and unique identifier 135 in accordance with the preferred or alternative HIN numbering syntax described above with respect to FIGS. 3A–3E. In an alternative embodiment, these functions are performed by the identification mechanism 501 or other component of the identification and configuration system 119 of the present invention. Once the hardware instance number 222 is determined, it is stored in the reference tables 117 which are later referenced to determine the optimal driver.

At block 806, the identification and configuration system 119 scans the registers 125 for additional information pertaining to the identified hardware instance 150. This information includes product identifier 140 and resource settings 142, identifying which hardware instances 150 are present for the given hardware device 148. In the embodiment wherein the bus interface 503 is NBI, this information is obtained using the well-known ScanCardInfo( ) method.

The ScanCardInfo() method is implemented iteratively as described above. As noted, alternative methods for retrieving such information are known in the art.

The identification and configuration system 119 stores the information retrieved from the hardware instance 150 at block 808 in the hardware information table 129.

The identification and configuration system 119 determines at block 810 whether any hardware instances 150 remain in the computer system 100. As noted, in the embodiment described herein, hardware instances 150 on all primary I/O buses 105, 106 are discovered iteratively. Thus, procedures to scan each primary I/O bus such as the ScanBusInfo( ) method are required when using these preferred methods. As one skilled in the art would find apparent, however, other processes and methodology may be used to scan all primary I/O buses that are appropriate for the implemented bus interface 503.

Figure 10:
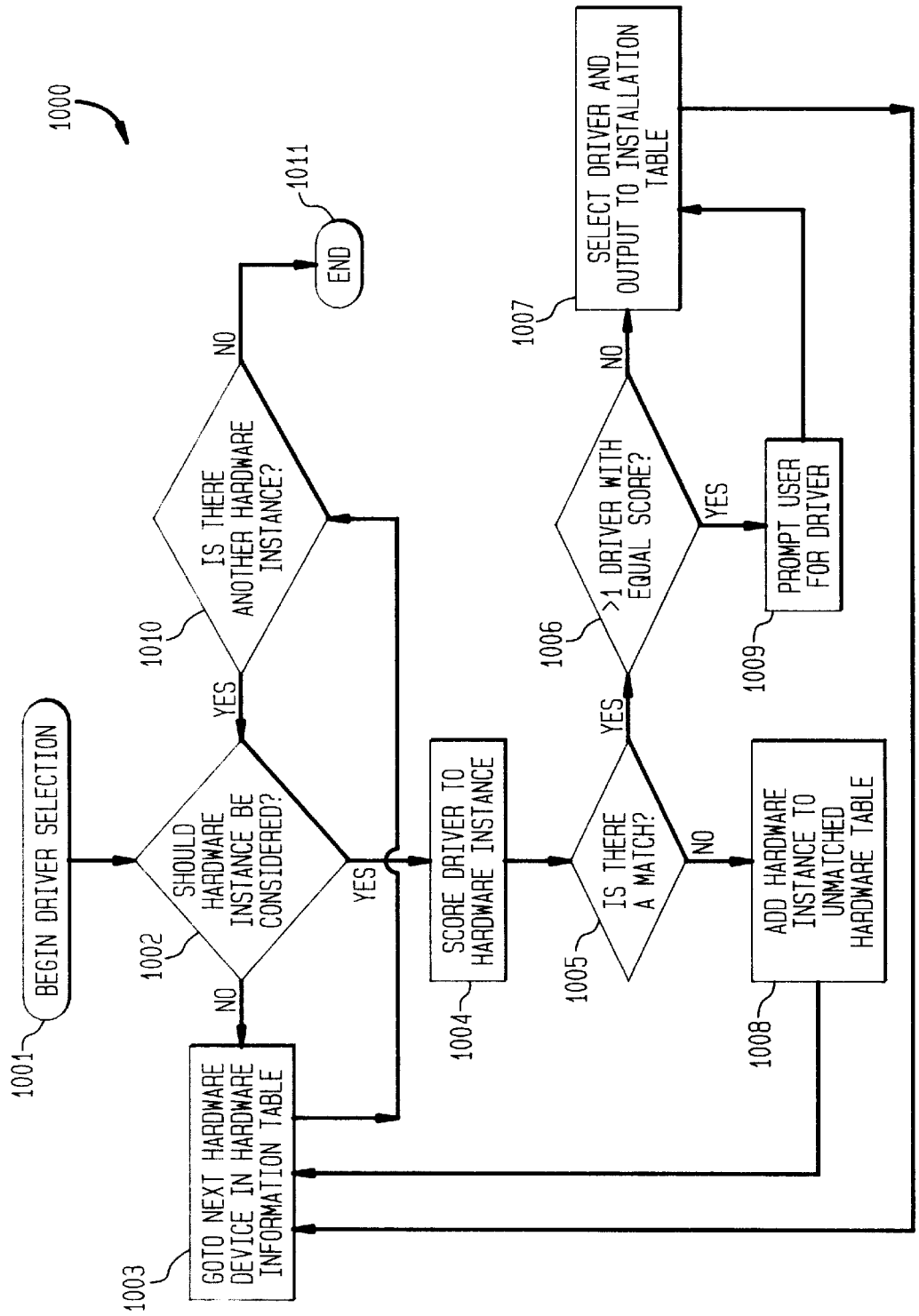
FIG. 10 is a flow chart of one embodiment of the driver selection process of the present invention.

If it is determined at block 810 that no hardware instances 150 remain, control is transferred to block 812 whereat the identification and configuration system 119 selects a driver for each of the identified hardware instances 150. This selection process will be described in detail below with reference to FIGS. 10–12. Otherwise, the above process is repeated for the remaining hardware instances 150.

During the above process, primary bus controllers are omitted since the detection methods of the above process do not detect these hardware devices. Specifically, the above process does not assign a driver 121 for those hardware devices 148 that have been previously assigned a driver 121 and are currently operational. Also, the above process does not detect hardware devices that cannot be detected through standard bus mechanisms. In the illustrative embodiment, this processing is shown as occurring after the drivers 121 have been associated with each discovered hardware instance 150 for ease of description. It is understood, however, that this process can be performed at any point during the implementation of the present invention. This processing is discussed below.

At block 814, the system 119 probes for primary bus controllers. If such hardware instances 150 are discovered at block 816, information for the identified hardware instance 150 is added to the hardware information table 129 at block 818. Since the driver 121 is already supporting the bus controller, information for the identified hardware instance 150 is also added to the matching driver table 131. Examples of such primary bus controllers are legacy ISA IDE bus controllers and legacy ISA network interfaces. Since there are preselected drivers for a legacy ISA IDE controller, no driver selection procedure is required for these devices. Also, since the legacy ISA IDE controllers or legacy ISA network interfaces have preselected drivers, these devices are omitted from the driver selection process discussed below.

At block 820, the installation information table 133 is output to the configuration mechanism 502 or other entities on the computer system 100 that may use such installation information. At block 822 the primary bus hardware identification process 800 is completed.

The peripheral bus hardware identification process introduced above at block 710 will now be discussed with reference to the flow chart illustrated in FIG. 9. This process is invoked in a well known manner by the identification and configuration system 119 of the present invention or the primary bus identification process 800 described above, although this process may be implemented to support any process or system that requires identification of peripheral bus hardware instances and the automatic assignment of an optimal driver to the discovered hardware instances. Control is then transferred to process 900 at block 901.

At block 902 a peripheral bus is scanned using the bus interface 503 to identify the hardware instances 150 on the peripheral buses. As discussed above, hardware device and instance information is obtained for hardware instances 150 on peripheral buses through well-known IDE or SCSI facilities such as an IDE identify operation or a SCSI inquiry.

The identification and configuration system 119 stores the information retrieved from the hardware instance 150 at block 902 in the hardware information table 129 at block 904. Since as defined herein the peripheral I/O bus controllers actively control the communications over the bus, the present invention does not generate a HIN number 222 for the hardware instances 150 discovered in the peripheral I/O buses.

At block 906, the identification and configuration system 119 determines whether any hardware instances 150 are remaining in the computer system 100. If so, control is transferred to block 902 whereat another hardware instance is obtained. If not, at block 908 the identification and configuration system 119 selects an optimal driver 121 to support the discovered hardware instances. This process is described in detail below with reference to FIGS. 10–12. As described above with reference to block 708, blocks 902–906 are preferably performed in an iterative manner.

At block 910, the installation information table 133 is made available to the configuration mechanism 503 or other interested entity such as the operating system 120. At block 912, the identification process 900 is terminated and control is returned to the calling mechanism.

As noted with reference to FIG. 8, at blocks 812 and 908 the identification system 501 selects a driver having the greatest relative capability to operate with a hardware particular instance 150. That is, the selected driver 121 is the optimal driver available in the system 100 to support a particular hardware instance 150. The driver selection process 1000 of the present invention performed at blocks 812 and 908 will now be described with reference to FIG. 10. Process 1000 may be called as a part of the primary bus hardware identification process 800, peripheral bus hardware identification process 900, or other process which requires a driver 121 to be associated with to a particular hardware instance 150.

A calling mechanism transfers control to the driver selection process 1000 at block 1001. The selection process 1000 obtains the hardware information table 129 and driver information table 130 and creates the matched driver table 131, unmatched hardware table 132, and installation information table 133 described above.

At block 1002 the identification and configuration system 119 determines whether a hardware instance 150 is to be considered or excluded for the driver selection process 1000. A hardware instance 150 may be excluded for a number of reasons. In one embodiment, these include when the hardware instance 150 is currently operating. Such a condition occurs when the hardware instance 150 is located on a primary bus controller such as bus controllers 108 and 109 shown in FIG. 1A. In another embodiment, the hardware instance 150 is not considered when the hardware instance 150 is a bus controller such as an IDE or SCSI controller that has a predetermined driver currently loaded in the memory 101. In an alternative embodiment, the hardware instance 150 is not considered when the hardware instance 150, such as ISA, is not detectable through software. Such instances do not support registers 125, sometimes requiring the IRQ and other resource settings 142 to be made through manual selection of DIP switches.

If the hardware instance 150 is not to be considered, control is then transferred to block 1003, wherein the identification mechanism 501 proceeds to the next hardware instance record 240 in the hardware information table 129.

At block 1010, it is determined whether any hardware instances 150 remain in the hardware information table 129. If not, the driver selection process 1000 is terminated at block 1011. If it is determined at block 1010 that another hardware instance record 240 exists in the hardware information table 129, control is returned to block 1002 and the above and following process is repeated.

If at block 1002 it is determined that the hardware instance 150 is to be considered for driver selection, control is passed to block 1004. At block 1004, the drivers 121 are evaluated for, or scored to, each of the hardware instances 150. Here, the value representing the drivers'0 relative capability to support the hardware instance 150 is determined. This determination is preferably based upon a number of factors, each of which provides some indication as to whether the associated hardware instance 150 can support the hardware device 150 in question.

Figure 11A:
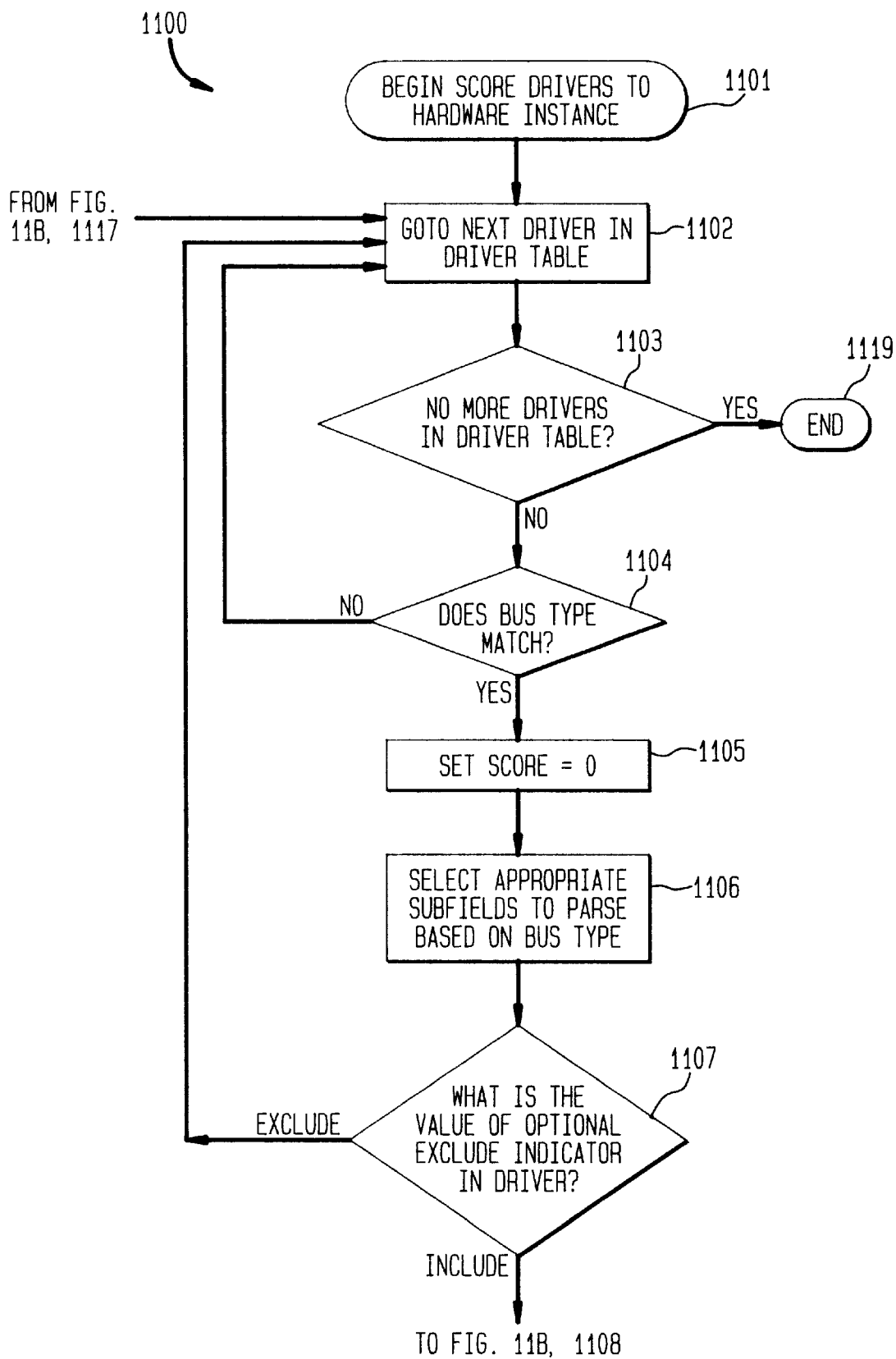
FIGS. 11A–11B are a flow chart of one embodiment of the driver scoring process of the present invention.
Figure 11B:
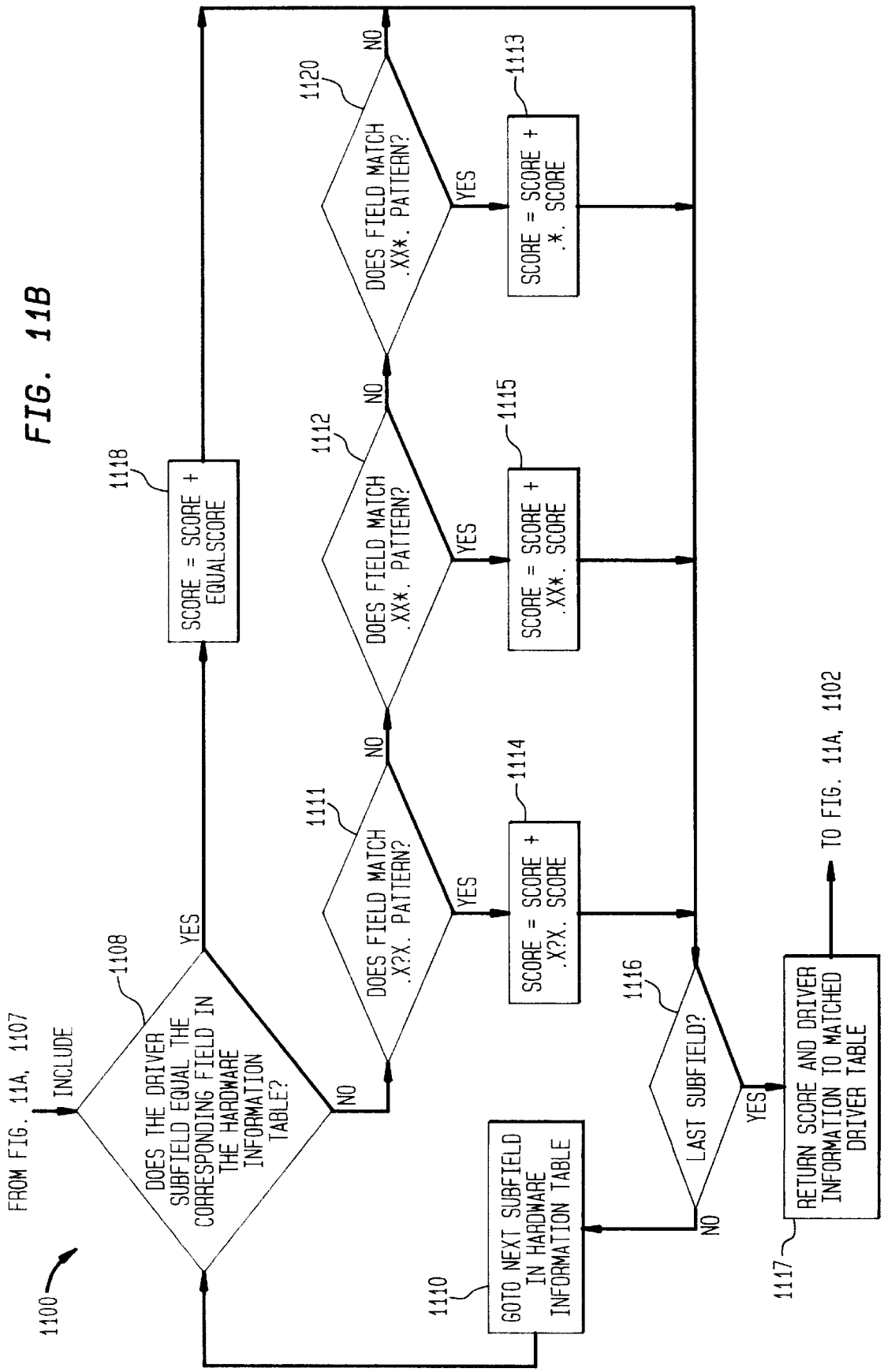

FIG. 11 illustrates one embodiment of the present invention to determine this relative capability to support the hardware instance, although other approaches are considered to be within the scope of the present invention. The factors are preferably weighted individually and combined to produce a total weighted value for the driver. The drivers 121 and their associated value or score are added to the matched driver table 131.

At block 1005 it is determined whether there are any drivers 121 listed in the matched driver table 131. If there are no records 242 in the matched driver table 131, the information pertaining to the hardware instance 150 is added to the unmatched hardware table 132 at block 1008. If it is determined at block 1005 that one or more driver matches occurred, control is transferred to block 1006.

At block 1006, it is determined whether there are multiple drivers 121 that are equally capable of supporting a particular hardware instance 150. If there is a single driver 121 which has a highest score in the driver information table 130, the driver information for that driver 121 is placed in the installation information table 133 at block 1007. In the case wherein two or more drivers are determined to be equally capable, and more capable than all other drivers, control advances to block 1009.

At block 1009, the user is prompted by the system 501 to select a driver 121 from the "most optimal" or "most capable" drivers 121. As a result of receiving a selected driver from the user at block 1009, the driver 121 is entered into the installation table 133 at block 1007.

The selection process 1000 continues with the next hardware instance 150 in the hardware information table 129 at block 1003 as noted above. If no hardware instances 150 remain as determined at block 1010, the process 1000 is competed at block 1011.

FIG. 11 is a flow chart illustrating one embodiment of the process performed to evaluate or score a driver 121 for a particular hardware instance 150. As noted, this evaluation process determines the relative capability of each driver 121 to support the particular hardware instance 150. In a preferred embodiment, this evaluation is based on a number of factors preferably weighted individually and combined to produce a total weighted value for the driver 121.

In one aspect of the invention, the factors are the data items in the product identifiers 140 and 141, which, as noted above, are retrieved from their respective sources and stored in reference tables 117. Accordingly, drivers 121 are evaluated based upon a degree of similarity between compared product identifier subfields. That is, the product identifier information 141 from the driver information table 130 and the product identifier information 140 from the hardware information table 129 are compared.

To better understand the process 1100 performed by the identification and configuration system 119, reference is first made to FIGS. 12A and 12B which illustrate in table form the specific subfields of the product identifiers 140 and 141 that are compared during the driver evaluation process 1100.

The determination as to which factors (i.e., which subfields) are considered is determined by the bus type 223 of the hardware instance 150. FIGS. 12A and 12B provide, for each bus type 223, the product identifier information provided by the driver descriptors 122, indicating which hardware instances 150 are supported by the driver; and the hardware device registers 125, identifying the hardware instance 150. As discussed above with reference to FIGS. 2A and 2B, the product identifiers 140 and 141 contain common data items which are stored in subfields in the product identifier 140 field of the hardware information table 129, and the product identifier 141 field of the driver information table 130.

However, not all data items are available in the driver's product identifier 141 or the hardware instance's product identifier 140. Referring to the first and second columns of the table illustrated in FIG. 12A, hardware instances 150 that are of the MCA bus type provide the bus type 223 and the vendor device ID 226 data items. Thus, only the subfields 223 and 226 are considered during driver evaluation for the MCA bus type hardware instances. On the other hand, for hardware instances 150 that are of the PnPISA bus type, the bus type 223, vendor ID 225, the vendor device ID 226 and product revision 229 data items are available, and considered in the associated driver evaluation.

FIG. 12C illustrates exemplary weights for various degrees of similarity between the data items of the product identifiers 140 and 141. The weights that are shown may be user-provided and stored in a static table, provided in lines of executable code in the software implementation of the present invention, determined in accordance with an algorithm or other approach. The weights that are assigned to the various factors (product data items) is a function of the degree to which the factors reflect the driver's capability to support the particular hardware instance 150.

In a preferred embodiment, the factors are further refined to vary according to the degree to which there is a match between the alphanumeric strings of each of the data items. In other words, if there is an exact match, the weight given to the factor is greater than if there is a partial match. For example, if there is an exact match between the bus type 223 of the driver information table 130 and the value of the bus type subfield 223 of the hardware information table 129, then the weight of 140 will be added to a total score for the driver 121. If there is a "?" (single character) wild card match, then the weight is reduced to 135.

Which portions or sequences of the alphanumeric strings that are considered is dependent upon the data item, hardware instance, hardware device, driver system environment, etc. Therefore the weights must be provided, in any format such as those noted above, based upon empirical studies and analysis of the drivers and hardware instances.

Referring to FIGS. 11, 12A–C, the driver evaluation process 1100 as described above with reference to block 1004 will now be described. After block 1101, the evaluation process 1100 proceeds to block 1102 whereat the identification mechanism 501 retrieves the next driver record 241 in the driver information table 130. At block 1103, it is determined whether there are no additional unevaluated drivers 121 in the driver information table 130. If not, then the process 1100 is terminated at end block 1119.

If it is determined at block 1103 that there are additional unevaluated drivers 121 in the driver information table 130, then the bus type field 223 of the current driver 121 is compared to the bus type field 223 in the hardware information table 129 at block 1104.

If the compared bus types 223 are not the same value, the driver 121 cannot support the hardware instance 150 and is therefore no longer considered. Processing then continues at block 1102 wherein the next driver 121 in the driver information table 130 is considered. If at 1104 it is determined that the bus types 223 of the driver 121 and hardware instance 150 are the same value, the score or total weight for the driver 121 will be set to zero at block 1105.

At block 1106, subfields of product identifier information fields 141 and 140 are selected to be evaluated for the driver in question. As noted, a list of these subfields for various I/O bus types appear in FIGS. 12A and 12B.

At block 1107, the identification mechanism 501 inspects the optional exclude indicator field 209 of the driver information table 130. A user may prefer to exclude a particular driver 121 for the driver selection process 1100. If it is determined at block 1107 that the driver 121 is to be excluded, the identification mechanism 501 will not consider the driver 121 in the selected process 1100. Advantageously, the optional exclude indicator 209 allows a user to manually override the automatic selection process of the present invention.

Once it is determined that the driver in question and the hardware instance are of the same bus type 223 and it is desired to include the driver in the evaluation process, the subfields selected at block 1106 and illustrated in FIGS. 12A and 12B are evaluated. The evaluation process determines which value, if any, from the table 1250 is to be added to the total weight or score for a driver 121 evaluation. This determination is based upon the number of characters in the compared data item strings that are the same.

At block 1108 the identification system 501 initially compares product identifier strings to determine whether there is an exact match between compared field strings. If so, the corresponding weight listed in FIG. 12C is added to the total score for the driver 121 at block 1118. If not, then at block 1111, the system 501 determines if there is a "?" wildcard match between the compared alphanumeric strings. That is, the driver includes a one-character wildcard "?" representing any one character within the alphanumeric string. In the case wherein a driver has an associated product identifier string of "12?" and a hardware instance has an associated product identifier string of "123", the comparison between these strings would yield a .X?X. pattern match. If so, at block 1114, the score corresponding to an .X?X. pattern in table 1250 for the compared subfield/data item is added to the total score.

Otherwise, the system 501 searches at block 1112 whether there is are multiple character differences at the end of the compared alphanumeric strings. If so, at block 1115, the score corresponding to the .XX*. pattern from table 1250 is added to the total weight or score for the driver 121 currently being considered. If the compared fields do not match at all, a predetermined weight (.*. pattern) from table 1250 is added to the total score or weight of the driver 121.

After a score has been added to the total score for the driver 121 in blocks 1113, 1114, 1115 or 1118, it is determined at block 1116 whether there are additional subfields to evaluate for the driver 121. If this was not the last subfield, control is passed to block 1110, wherein the next subfields are determined at step 1106. If this was the last subfield, the total score and driver information from the driver information table 129 is entered into the matched driver table 131. Processing continues at block 1102 whereat the next driver record 241 is retrieved. The driver evaluation process 1100 is complete when there are no additional drivers remaining in the driver information table 130, as determined by block 1103. At block 1119, the process 1100 to score drivers to a hardware instance is completed.

Figure 13:
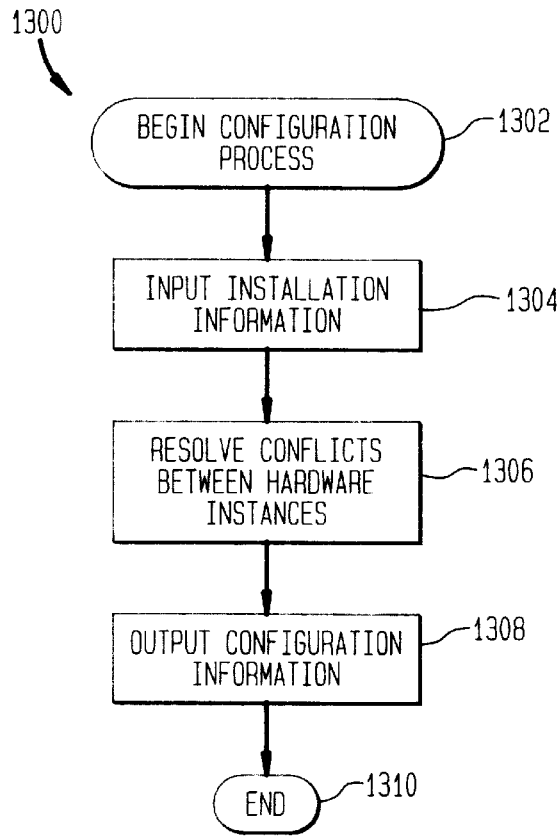
FIG. 13 is a flow chart of one embodiment of the configuration process of the present invention.

The configuration process performed by the configuration mechanism 502 of the present invention is shown in FIG. 13. The hardware instance 150 can be configured once a driver 121 has been selected for the hardware instance 150. At block 1304, the configuration mechanism 502 obtains the installation information from the installation information table 129 and matched driver table 132.

At block 1306, the configuration mechanism 502 resolves any conflicts in the resource settings 142 of the hardware instances. As discussed previously, the configuration mechanism 502 resolves conflicts in hardware device resource settings to insure that the drivers 121 selected in accordance with the present invention fully support the associated hardware instance 150 when loaded in the system 100. Specifically, the configuration mechanism 502 determines if there is a conflict in resource settings 142 stored in the hardware information table 129. If there is a conflict, the configuration mechanism 502 could modify the resource settings 142 for the hardware instances that are programmable through the bus interface 503. In particular, if conflicting resource settings identify a resource that is not a shareable resource, the configuration mechanism 502 sets the resource registers 125 of one of the conflicting hardware devices to a non-conflicting resource setting. If a non-conflicting setting cannot be determined because either the conflicting hardware device does not have writable registers, or the device 150 is not programmable through software, the driver 121 will not be loaded.

At block 1308, the configuration mechanism 502 stores the updated resource setting information in the installation information table 133. The configuration mechanism 502 may also remove the hardware devices 150 that have unresolvable conflicts from the installation table 133. In one embodiment, the configuration mechanism 502 loads the selected optimal drivers 121 for each hardware instance 150 according to the resource settings 142. In an alternative embodiment, the selected drivers 121 are loaded in any well-known manner, such as through a configuration file or a command line. In the case of a network interface card or other network hardware instance, the configuration mechanism 502 may perform additional configuration functions as shown in FIG. 14.

Figure 14:
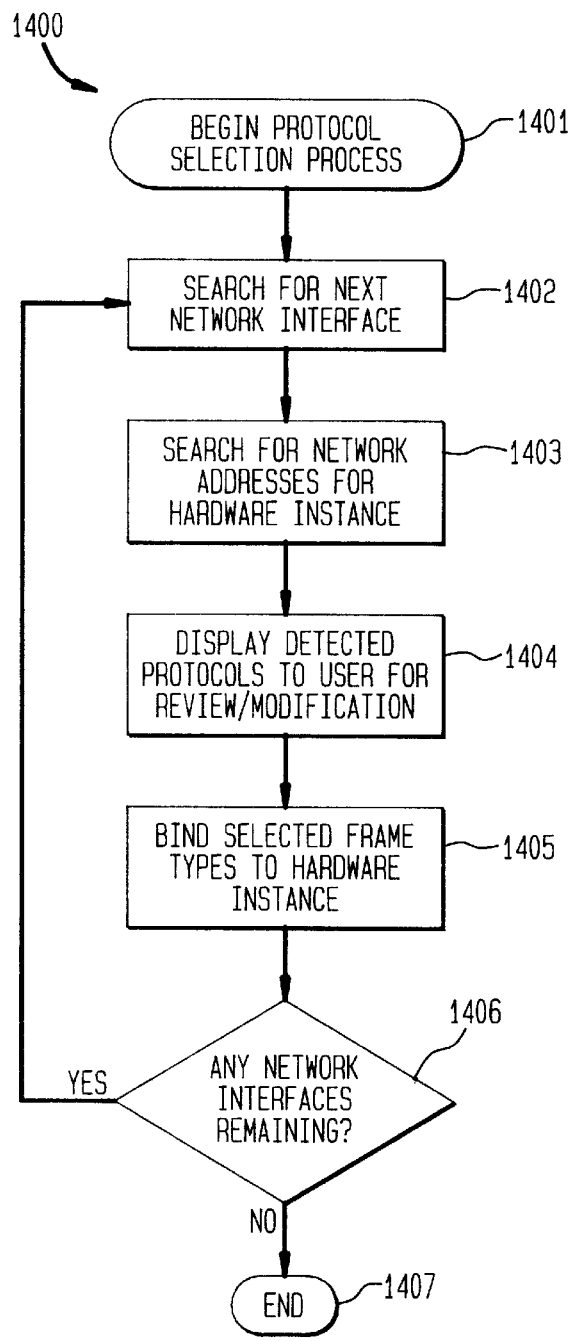
FIG. 14 is a flow chart of one embodiment of the protocol selection mechanism of the present invention.

FIG. 14 illustrates a flow chart of a protocol selection process. The protocol selection process 1400 may be performed as part of the configuration process 1300. The protocol selection process 1400 uses the hardware information table 129 to determine, select and configure protocols on one or more network interfaces. Preferably, the process 1400 may be implemented by the configuration mechanism 503.

After begin block 1401, at block 1402 a search is performed for a network interface in the hardware information table 202. It is assumed that if the process 1400 is performed and it is preferable that the computer system 100 is attached to a network, at least one network interface is present on the computer system 100.

At block 1403, network addresses are determined for various networking protocols when such an interface is found. Networking protocols, such as AppleTalk and IPX, are well-known in the art. In the AppleTalk networking protocol, for instance, a cable range, a default zone, and an AppleTalk network address is determined for the interface in addition to a frame type for the protocol. For the IPX networking protocol, an IPX network number is determined for various IPX frame types which could be present on the network.

At block 1404, the user is allowed to review the discovered protocols and protocol settings. Upon review by the user, at block 1405 the appropriate protocols and frame types are bound to the network interface. Binding a protocol to a network interface is described as an association of a protocol to a physical network interface.

At block 1406, the protocol selection process searches for an additional network interface in the hardware information table 129. If another network interface is found in the hardware installation table 133, steps 1402–1405 are repeated for the detected interface. If another network interface is not found, control is returned to the calling mechanism at block 1407. It is noted that determining network addresses and discovering protocol frame types are well known in the art of computer system networking.

Notably, the protocol selection mechanism 1400 frees the user from having prior knowledge of network interface hardware in the computer system 100; no prior knowledge of the protocol types supported by the network interface hardware or network address to which the network interface is attached is required.

It is noted that in the case of a legacy ISA network interface used in a computer system 100 that is the object of a Novell IntranetWare® operating system installation, a network interface must be detected and configured prior to installation. In this case, for a legacy network interface that is currently operating, a server drivers suitable for an IntranetWare® server would be mapped to the loaded driver for use when the computer system 100 runs as a server. In addition, the computer system 100 resource settings would be preserved for use by the server driver. Notably, this allows a different driver to be loaded upon reboot in place of a driver that is currently loaded.

The process performed by the manual driver selection and modification mechanism 601 will now be described with reference to FIG. 15. As noted, the manual driver selection and modification process 1500 allows a user to modify installation information produced by the identification mechanism 501. Process 1500 may be called by the identification process 700 or other process.

At block 1501, the system 601 displays a list drivers from the matched drive table to the user for review. At block 1502, the user could select additional drivers or modify drivers from the displayed list of drivers.

At block 1503, the selected drivers are output to the installation information table and are made available to entities such as the configuration mechanism 502. Such installation information could be used, for example, as startup information for the computer system 100 during the next bootup cycle, or by the configuration mechanism 502 which would consequently load all drivers listed in the installation information table.

Although the present invention automatically identifies and configures the computer system 100, user interactions may be necessary or desired to configure the computer system 100. There are three cases wherein user interaction may be required: (1) the driver 121 is loaded with configuration information on the command line; (2) the driver is loaded without specifying configuration information on the command line; (3) or an installation utility is used.

In the NetWare® or IntranetWare® operating system, the driver 121 is loaded with a load command, followed by a series of configuration information, such as the SLOT= <number> that specifies the physical slot number that the driver is to be loaded for. The user must be able to determine, either with help from documentation, or by other information, what the correct configuration information needs to be. Especially difficult for a user is the determination of what the configuration information should be for architectures in which a HIN number 222, referred to as a virtual slot number, is required (PCI BIOS v2.0, PCI motherboard devices, ISA PnP, etc.).

The user typically has great difficulty determining this configuration information, and may often rely on documentation and samples. Consequently, a utility that prints to the computer screen a list of all available hardware instances 150 and their configuration information is useful to a user. Additional information is displayed in addition to the SLOT= parameters for each hardware instance 150. For example, such display information includes hardware information table information 129, such as the model ID 224 or the vendor ID 225 for each hardware instance.

If the driver 221 is loaded without specifying the configuration information on the command line, the user is prompted with a list of available hardware instances 150, if there is more than one hardware instance 150 to which a driver corresponds. If there is only one hardware instance 150, no prompting is necessary. The case of multiple instances is illustrated in the following example.

If an installation utility is to be used, it displays a list of available hardware instances 150, and lets the user select the driver, or preferably, automatically select drivers 221 for the user and confirm the list to the user.

An example of the user interaction required to load a driver with the information on the command line will now be discussed with reference to the example computer system 1600 in FIGS. 16A and 16B. In addition, FIGS. 16A and 16B illustrate the resulting virtual bus and hardware instance names and numbers generated by the present invention.

FIG. 16A shows an exemplary arrangement, including multiple interconnected busses 1604–1607, hardware devices, and a processor 1601. The physical computer system 1600 comprises a CPU-memory bus 1603 and four primary I/O buses 1604–1607. The EISA bus 1604 has 4 slots, two of which have hardware devices (Device 1 and Device 2) installed and two that do not. The PCI bus 0 1605 has thee hardware devices (Device 1, Device 2 and Device 3) and a PCI Bus 1 1606 connected to it, through which two devices are attached to the computer system 1600. The PCI Bus 1 1606 has one device attached that appears as two hardware instances since it is a dual port Ethernet card. This card is in slot 7. Finally, the PCCARD bus 1607 has two sockets, one of which has an Ethernet PCMCIA card installed while the other is empty.

FIG. 16B shows how the HIN name 315 and HIN numbers 222 are assigned to hardware instances 150 in the physical system 1600 in accordance with the present invention. The HIN numbering and naming convention treats multiple busses by having the busses appear to the user as one single virtual bus 1602, with each hardware instance 150 having a unique hardware instance number 222 or virtual slot number on the bus. Each hardware instance also has a unique HIN name 315 that identifies it to the user.

For example, the computer system 1600 uses IntranetWare® networking software. A driver operates with the motherboard Ethernet, a dual Ethernet, and a PC Card in socket number 1. If the user wants to load the driver for the PC Card, and the user has a prior knowledge of what hardware instances 150 are in the computer system 1600, the user types in the IntranetWare® startup file:

load DRIVER slot=pccard.slot_1 frame=ethernet_802.2

If the user is not familiar with what hardware instances 150 are in the computer system 1600, and puts the following in the startup file, load DRIVER The user would be prompted with, referring to the HIN name 315 assignments of FIG. 16B:

Load DRIVER for which hardware?
1. PCI.EMBEDDED_ETHERNET
2. PCI.SLOT_7.1
3. PCI.SLOT_7.2
4. PCCARD.SLOT_1

Selection (1–4)?1

If the operating system was not HIN-aware, referring to the HIN number 222 assignments of FIG. 16B, the user is prompted with:

Specify the slot number.
Available choices are 1, 701, 702, 10001.
Which slot?1

If the environment was not HIN-aware, the complete load line for the PC Card hardware is:

load DRIVER slot=1 frame=ethernet_802.2

Therefore, the manual driver selection and modification provides more information to the user than in a non-HIN aware operating system environment.

There are portions of this identification and configuration system 119 which could be abstracted into functional modules, as in a functional programming language or object-oriented programming language such as C++, such as the automatic identification mechanism 301 and the configuration mechanism 302. These functional modules could be made available to applications such as installation utilities as shown above, monitoring software and network management software for the purpose of identifying and configuring hardware instances. Thus, applications could refer to hardware instances in a common manner.

Note that more than one identification mechanism can coexist, such as the bus tag and unique identifier. Coexistence is acceptable provided there is also an unambiguous method for translating one identification mechanism into and back from the identification system of another entity. Thus, any numbering and naming system which provides the aforementioned features should be considered within the scope of the invention.

Although this invention generally describes a method for assigning identifiers to hardware instances in Intel processor computer systems, it is understood that these methods could be easily adapted for use with any network or computer system environment used to identify and configure a device or element in a computer system.

While various embodiments of the present invention have been described above, it should be understood that they have been presented by way of example only, and not limitation. Thus, the breadth and the scope of the present invention are not limited by any of the above-described exemplary embodiments, but are defined only in accordance with the following claims and their equivalents.

What is claimed is:

1. A automatic identification system in a computer system having a plurality of hardware instances located on hardware devices in the computer system, the computer system including a plurality of physical slots each configured to connect to a hardware device and referenced by a slot number, the system comprising:

means for assigning a hardware instance value to each of the plurality of hardware instances, said hardware instance value being unique within the computer system and based upon the physical slot number of the physical slot to which the hardware device is connected, said means configured to assign said unique hardware instance regardless of a quantity of physical slots that are assigned a slot number that is not unique within the computer system.

2. The system of claim 1, wherein two or more of the plurality of hardware instances are located on one of the hardware devices.

3. The system of claim 1, wherein one or more of the hardware devices is installed in an expansion chassis coupled to the computer system.

4. The system of claim 1, wherein one of the hardware devices includes one or more of the hardware instances coupled to an I/O bus within the hardware device.

5. The system of claim 1, wherein one or more of the hardware devices is installed on a system board in the computer system.

6. The system of claim 1, wherein said hardware instance value is a hardware instance number.

7. The system of claim 1, wherein said hardware instance value is a hardware instance name.

8. The system of claim 1,
wherein each of the hardware devices contains a bus tag and a device identifier for each hardware instance on the hardware device, and
wherein, for each hardware instance, said hardware instance value is a hardware instance number associated with the bus tag and device identifier for said each hardware instance.

9. The system of claim 6,
wherein a first one or more of the plurality of physical slots is assigned a slot number unique within the computer system, and
wherein, for each the plurality of hardware instances installed within said first physical slots, said hardware instance number is equal to said unique slot number.

10. The system of claim 6,
wherein a second two or more of the plurality of physical slots is assigned a slot number that is non-unique within the computer system, and
wherein, for each the plurality of hardware instances installed within said second physical slots, said hardware instance number is equal to said unique slot number and a sequence number associated with said hardware instance, said sequence number being unique for each said hardware instance in said physical slot.

11. The system of claim 6,
wherein one or more third hardware instances do not correspond to a physical slot within the computer system, and wherein, for each the third hardware instances, said hardware instance number is equal to said unique slot number and a sequence number associated with said hardware instance, said sequence number being unique for each said third hardware instance.

12. The system of claim 1, wherein the physical slot number of said two or more of the plurality of hardware instances is the same value.

13. An identification and configuration system in a computer system having a hardware instance and a plurality of drivers capable of supporting the hardware instance, the hardware instance including a plurality of resource settings, the system comprising:

means for determining a relative capability of each of the plurality of drivers to support the hardware instance;

means for selecting an optimal driver having a capability to support the hardware instance than is greater than a capability of other drivers to support the instance; and means for resolving conflicts between a resource setting of the hardware instance and a resource setting of another hardware instance, wherein, for each identified resource setting conflict, said means for resolving either modifies the resource setting in the hardware instance to a non-conflicting setting or, if unable to do so, prevents loading of the selected optimal driver.

14. The system of claim 13, further comprising:

means for installing said optimal driver.

15. The system of claim 13, wherein said capability of a driver to support the hardware instance is represented by a value derived from one or more factors, each reflecting a driver's capability to support a particular hardware instance.

16. The system of claim 15, wherein said factors are weighted in accordance with a degree to which the factor reflects a driver's capability to support a particular hardware instance.

17. The system of claim 16, wherein said value is the sum of said weights of said factors.

18. The system of claim 15, wherein said factors are associated with a first product identifier identifying the hardware instance, and plurality of second product identifiers, each identifying, for an associated one of said plurality of drivers, the hardware instances supported by said associated driver.

19. The system of claim 18, wherein a first factor is a similarity between said first and second product identifier.

20. The system of claim 18, wherein said first factor is weighted value according to a similarity between said first and second product identifier.

21. The system of claim 18, wherein said selecting means comprises:

means for comparing portions of said first and second product identifiers, wherein said factors include second factors, each representing a similarity between said compared portions of said first and second product identifiers.

22. The system of claim 19, wherein said second factors are weighted values according to a similarity between said corresponding portions of said first and second product identifier.

23. The system of claim 22, wherein said degree of similarity is a degree of difference between string values of said compared product identifier subfields.

24. The system of claim 23, wherein said portions of said first and second product identifiers comprise:

a model ID identifying the model of the associated hardware instance;

a vendor ID identifying the vendor of the hardware instance; and a vendor device ID identifying the device number of the hardware instance assigned by the vendor.

25. The system of claim 24, wherein said portions of said first and second product identifiers further comprise:

a product revision identifying a version of the hardware instance.

26. The system of claim 25, wherein said portions of said first and second product identifiers further comprise:

a subvendor ID identifies the vendor which manufactures the particular chip or hardware component in the hardware instance; and a subvendor device ID identifies the vendor-assigned device number for the components of the hardware instance.

27. An automatic identification and configuration system in a computer system having a plurality of hardware instances located on hardware devices in the computer system, the computer system including a plurality of physical slots each configured to receive a hardware device and referenced by a slot number, and a plurality of drivers capable of supporting the hardware instances, the system comprising:

means for assigning a hardware instance value to each of the plurality of hardware instances, said hardware instance value being unique within the computer system;

means for determining a relative capability of each of the plurality of drivers to support the hardware instance;

means for selecting an optimal driver having a capability to support the hardware instance that is greater than a capability of other drivers to support the hardware instance;

means for resolving conflicts between a resource setting of the hardware instance and a resource setting of another hardware instance, wherein, for each identified resource setting conflict, said means for resolving either modifies the resource setting in the first hardware configuration information to a non-conflicting setting or, if unable to do so, prevents loading of the selected optimal driver; and means for installing said optimal driver.

28. The system of claim 27, wherein said capability of a driver to support the hardware instance is represented by a value derived from one or more factors, each reflecting a driver's capability to support a particular hardware instance.

29. The system of claim 28, wherein said factors are weighted in accordance with a degree to which the factor reflects a driver's capability to support a particular hardware instance.

30. The system of claim 29, wherein said factors are associated with a first product identifier identifying the hardware instance, and plurality of second product identifiers, each identifying, for an associated one of said plurality of drivers, the hardware instances supported by said associated driver.

31. The system of claim 29, wherein a first factor is a similarity between said first and second product identifier.

32. The system of claim 29, wherein said selecting means comprises:

means for comparing portions of said first and second product identifiers, wherein said factors include second factors, each representing a similarity between said compared portions of said first and second product identifiers, wherein said second factors are weighted values according to a similarity between said corresponding portions of said first and second product identifier.

33. The system of claim 32, wherein said portions of said first and second product identifiers comprise:
   a model ID identifying the model of the associated hardware instance;
   a vendor ID identifying the vendor of the hardware instance;
   a vendor device ID identifying the device number of the hardware instance assigned by the vendor; and
   a product revision identifying a version of the hardware instance.

34. The system of claim 33, wherein said portions of said first and second product identifiers further comprise:
   a subvendor ID identifies the vendor which manufactures the particular chip or hardware component in the hardware instance; and
   a subvendor device ID identifies the vendor-assigned device number for the components of the hardware instance.

35. The system of claim 31,
   wherein each of the hardware devices contains a bus tag and a device identifier for each hardware instance on the hardware device, and
   wherein, for each hardware instance, said hardware instance value is a hardware instance number associated with the bus tag and device identifier for said each hardware instance.

36. A hardware identification and configuration system in a general purpose computer system including a first hardware device having first hardware configuration information and a second hardware device having second hardware configuration information, the system comprising:
   an identification mechanism configured to obtain said first and second hardware configuration information; and
   a configuration mechanism configured to resolve a conflict between said first and second hardware configuration information, wherein said conflict is a conflict between resource requirements of said first and second hardware configuration information and wherein, for each identified resource setting conflict, said configuration mechanism for resolving modifies the resource setting in the first hardware configuration information to a non-conflicting setting.

37. The system of claim 36, wherein said first and second hardware configuration information are obtained from the first and second hardware devices, respectively.

38. The system of claim 37, wherein said first and second hardware configuration information are obtained hardware device registers located in said first and second hardware devices, respectively.

39. The system of claim 36, wherein said first and second hardware configuration information are obtained from a table in a memory of the computer system.

40. The system of claim 36, further comprising:
   a manual driver selection modification mechanism configured to allow a user to review and modify said first and second hardware configuration information.

41. A method for automatically identifying and configuring a plurality of hardware instances on a computer system, the method comprising the following steps:
   a) uniquely identifying each of the plurality of hardware instances;
   b) selecting an optimal driver with the highest relative capability from a plurality of drivers configured to support each of the plurality of hardware instances;
   c) resolving a conflict between a resource requirement setting of a first hardware instance and a resource requirement setting of a second hardware instance, including the steps of,
      1) determining that the conflict exists, and
      2) attempting to modifying a resource requirement setting in the first hardware instance to a non-conflicting setting when a conflict is identified in step 1); and
   d) if the resourd requirement setting is a non-conflicting setting, loading said selected optimal driver into a run-time memory of the computer system, otherwise, avoid loading of the selected optimal driver.

42. The method of claim 41, wherein said step a) includes the steps of:
   1) identifying the plurality of drivers stored on the computer system;
   2) scanning busses for the plurality of hardware instances;
   3) identifying each of the plurality of hardware instances; and
   4) scanning each of the plurality of hardware instances for hardware instance information.

43. The method of claim 42, further comprising the step of:
   5) storing the hardware instance information in a table in said run-time memory of the computer system.

44. The method of claim 42, wherein each of a plurality of driver descriptors, each associated with one or said plurality of drivers, includes a product identifier specifying specific hardware instances that each of said plurality of drivers can support and wherein said step 1) comprises the step of:
   (a) scanning each of said plurality of driver descriptors associated with each of said plurality of drivers for said product identifier.

45. The method of claim 44, wherein said step 5) comprises the step of:
   (a) scanning registers of each hardware instance for hardware instance information, said hardware instance information including a product identifier and resource settings.

46. The method of claim 45, wherein the product identifier of each hardware instance and the product identifier of each driver descriptor includes a plurality of factors.

47. The method of claim 42, wherein said step 3) comprises the steps of:
   (a) uniquely identifying each hardware instance by a hardware instance number equal to a physical slot number on the computer system, when said physical slot number is unique; and
   (b) uniquely identifying each hardware instance by a hardware instance number equal to a sequence number when said physical slot number is not unique.

48. The method of claim 47, wherein said step b) comprises the steps of:
   1) comparing each factor for the product identifier of each hardware instance to the associated factor for the product identifier of each driver descriptor;
   2) determining a weighted score for each factor based on the comparing step;
   3) combining the weighted scores of each factor to produce a total weighted value for each of said driver descriptors; and
   4) selecting said optimal driver from said plurality of drivers based on said total weighted value.

49. A computer readable medium encoded with a program that, when executed on a computer system, performs a method for automatically identifying and configuring a plurality of hardware instances on the computer system, the method comprising steps of:

a) uniquely identifying each of the plurality of hardware instances;

b) selecting an optimal driver with the highest relative capability from a plurality of drivers configured to support each of the plurality of hardware instances;

c) resolving a conflict between a resource requirement setting of a first hardware instance and a resource requirement setting of a second hardware instance, including the steps of, 1) determining that the conflict exists, and 2) attempting to modifying a resource requirement setting in the first hardware instance to a non-conflicting setting when a conflict is identified in step 1); and d) if the resource requirement setting is a non-conflicting setting, loading said selected optimal driver into a run-time memory of the computer system, otherwise, avoid loading of the selected optimal driver.

50. The computer readable medium of claim 49, wherein said step a) includes the steps of:

1) identifying the plurality of drivers stored on the computer system;

2) scanning busses for the plurality of hardware instances;

3) identifying each of the plurality of hardware instances; and 4) scanning each of the plurality of hardware instances for hardware instance information.

51. The computer readable medium of claim 50, wherein the method further comprises a step of:

5) storing the hardware instance information in a table in said run-time memory of the computer system.

52. The computer readable medium of claim 50, wherein each of a plurality of driver descriptors, each associated with one or said plurality of drivers, includes a product identifier specifying specific hardware instances that each of said plurality of drivers can support and wherein said step 1) comprises the step of:

(a) scanning each of said plurality of driver descriptors associated with each of said plurality of drivers for said product identifier.

53. The computer readable medium of claim 52, wherein said step 5) comprises the step of:

(a) scanning registers of each hardware instance for hardware instance information, said hardware instance information including a product identifier and resource settings.

54. The computer readable medium of claim 53, wherein the product identifier of each hardware instance and the product identifier of each driver descriptor includes a plurality of factors.

55. The computer readable medium of claim 50, wherein said step 3) comprises the steps of:

(a) uniquely identifying each hardware instance by a hardware instance number equal to a physical slot number on the computer system, when said physical slot number is unique; and (b) uniquely identifying each hardware instance by a hardware instance number equal to a sequence number when said physical slot number is not unique.

56. The computer readable medium of claim 55, wherein said step b) comprises the steps of:

1) comparing each factor for the product identifier of each hardware instance to the associated factor for the product identifier of each driver descriptor;

2) determining a weighted score for each factor based on the comparing step:

3) combining the weighted scores of each factor to produce a total weighted value for each of said driver descriptors; and 4) selecting said optimal driver from said plurality of drivers based on said total weighted value.

57. A computer program product comprising a computer readable medium having a computer program logic thereon for enabling a processor in a computer system to automatically identify and configure hardware in a general purpose computer system, the computer system including a first hardware device having first hardware configuration information and a second hardware device having second hardware configuration information, the computer program product comprising:

an identification mechanism configured to obtain said first and second hardware configuration information; and a configuration mechanism configured to resolve a conflict between said first and second hardware configuration information, wherein said conflict is a conflict between resource requirements of said first and second hardware configuration information and wherein, for each identified resource setting conflict, said configuration mechanism for resolving modifies the resource setting in the first hardware configuration information to a non-conflicting setting.

58. The computer program product of claim 57, wherein said first and second hardware configuration information are obtained from the first and second hardware devices, respectively.

59. The computer program product of claim 58, wherein said first and second hardware configuration information are obtained hardware device registers located in said first and second hardware devices, respectively.

60. The computer program product of claim 57, wherein said first and second hardware configuration information are obtained from a table in a memory of the computer system.

61. The computer program product of claim 57, further comprising:

a manual driver selection modification mechanism configured to allow a user to review and modify said first and second hardware configuration information.

* * * * *